(12) United States Patent
Inoue

(10) Patent No.: US 11,597,376 B2
(45) Date of Patent: Mar. 7, 2023

(54) CONTROL SYSTEM OF HYBRID VEHICLE

(71) Applicant: TOYOTA JIDOSHA KABUSHIKI KAISHA, Toyota (JP)

(72) Inventor: Toshio Inoue, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/371,165

(22) Filed: Jul. 9, 2021

(65) Prior Publication Data
US 2022/0063587 A1  Mar. 3, 2022

(30) Foreign Application Priority Data

Sep. 2, 2020  (JP) .............................. JP2020-147891

(51) Int. Cl.
*B60W 20/16*  (2016.01)
(52) U.S. Cl.
CPC ..... *B60W 20/16* (2016.01); *B60W 2510/0676* (2013.01); *B60W 2710/0644* (2013.01)
(58) Field of Classification Search
CPC .. B60W 20/16; B60W 30/165; B60W 30/192; B60W 60/001; B60W 2510/0676; B60W 2710/0627; B60W 2710/0644
See application file for complete search history.

(56) References Cited

U.S. PATENT DOCUMENTS

| | | | |
|---|---|---|---|
| 2012/0245774 A1* | 9/2012 | Takami ............... | B60L 15/2072 903/906 |
| 2017/0259810 A1* | 9/2017 | Zhang .................. | B60W 20/10 |
| 2018/0208181 A1* | 7/2018 | Schneider ............. | B60K 6/387 |
| 2019/0315340 A1 | 10/2019 | Morisaki | |
| 2020/0298817 A1* | 9/2020 | Nakano ............... | F02N 11/0803 |
| 2022/0233991 A1* | 7/2022 | Conrad ................. | B01D 46/48 |

FOREIGN PATENT DOCUMENTS

JP   2019-182335 A   10/2019

* cited by examiner

*Primary Examiner* — George C Jin
(74) *Attorney, Agent, or Firm* — Oliff PLC

(57) ABSTRACT

When a vehicle is in a traveling state having a low necessity to quickly increase required traveling torque, high-rotational-speed engine starting unit that reduces an emission amount of particulate matter emitted during engine starting starts the engine. Since quick torque response is not required when the vehicle is in the traveling state having the low necessity to quickly increase the required traveling torque, the high-rotational-speed engine starting unit starts the engine, so that increase of the emission amount of particulate matter emitted during engine starting can be curbed.

9 Claims, 8 Drawing Sheets

| | CONTENT OF ENGINE START | ENGINE TORQUE RESPONSE | CRANKING TORQUE | EV REGION (EV-PERMITTED MG TORQUE) | FUEL ECONOMY (∝EV REGION) | PM EMISSION AMOUNT |
|---|---|---|---|---|---|---|
| A. IGNITION STARTING | INJECTION & IGNITION FROM EXPANSION-STROKE CYLINDER UPON ENGINE INTERMITTENT STOP | FASTEST | MINIMUM | MAXIMUM | OPTIMUM | LARGEST |
| B. COMPRESSION STROKE STARTING | INJECTION & IGNITION FROM COMPRESSION-STROKE CYLINDER | FAST | SMALL | LARGE | GOOD | LARGE |
| C. INTAKE STROKE STARTING | INJECTION & IGNITION FROM INTAKE-STROKE CYLINDER | FAST | SMALL | LARGE | GOOD | LARGE |
| D. HIGH-ROTATIONAL-SPEED STARTING | IGNITION & IGNITION AFTER CRANKING TO ENGINE SPEED > PREDETERMINED SPEED | SLOW | LARGE | SMALL | NORMAL | NORMAL |

FIG. 5

| | CONTENT OF ENGINE START | ENGINE TORQUE RESPONSE | CRANKING TORQUE | EV REGION (EV-PERMITTED MG TORQUE) | FUEL ECONOMY (∝ EV REGION) | PM EMISSION AMOUNT |
|---|---|---|---|---|---|---|
| A. IGNITION STARTING | INJECTION & IGNITION FROM EXPANSION-STROKE CYLINDER UPON ENGINE INTERMITTENT STOP | FASTEST | MINIMUM | MAXIMUM | OPTIMUM | LARGEST |
| B. COMPRESSION STROKE STARTING | INJECTION & IGNITION FROM COMPRESSION-STROKE CYLINDER | FAST | SMALL | LARGE | GOOD | LARGE |
| C. INTAKE STROKE STARTING | INJECTION & IGNITION FROM INTAKE-STROKE CYLINDER | FAST | SMALL | LARGE | GOOD | LARGE |
| D. HIGH-ROTATIONAL-SPEED STARTING | IGNITION & IGNITION AFTER CRANKING TO ENGINE SPEED > PREDETERMINED SPEED | SLOW | LARGE | SMALL | NORMAL | NORMAL |

CONTROL SYSTEM OF HYBRID VEHICLE

CROSS-REFERENCE TO RELATED APPLICATION

This application claims priority to Japanese Patent Application No. 2020-147891 filed on Sep. 2, 2020, incorporated herein by reference in its entirety.

BACKGROUND

1. Technical Field

The disclosure relates to a control system of a hybrid vehicle that has an engine and a motor as driving force sources.

2. Description of Related Art

A hybrid vehicle having an engine and a motor as driving force sources is well known in the art. An example of the hybrid vehicle is described in Japanese Unexamined Patent Application Publication No. 2019-182335 (JP 2019-182335 A). During traveling in an automatic driving mode, and during traveling in a motor traveling mode using an electric motor, the vehicle is kept in the motor traveling mode using the motor when the vehicle is not following another vehicle, and the vehicle is permitted to transition to a hybrid traveling mode using the engine and the motor when the vehicle is following another vehicle, as described in JP 2019-182335 A. Also, cranking torque is increased when the vehicle is following another vehicle, as described in JP 2019-182335 A.

SUMMARY

In the hybrid vehicle, operation (intermittent operation) to stop and start the engine according to a traveling state of the vehicle is performed, but, depending on a method of starting the engine, the emission amount of particulate matter (PM) contained in exhaust gas may be excessively large.

This disclosure provides a control system that can reduce the emission amount of particulate matter (PM) during engine starting, in a hybrid vehicle having an engine and a motor as driving force sources.

A control system of a hybrid vehicle that has an engine and a motor as driving force sources, and is configured to be able to stop and start the engine during traveling, is provided according to one aspect of the disclosure. The control system includes a plurality of engine starting units that starts the engine, and the engine starting units includes a first engine starting unit that curbs increase of an emission amount of particulate matter emitted during starting of the engine. The first engine starting unit starts the engine, when the hybrid vehicle is in a traveling state having a low necessity to quickly increase traveling torque of the hybrid vehicle.

The control system as described above may further include an automatic driving controller that controls traveling of the hybrid vehicle to cause the hybrid vehicle to travel in an automatic driving mode, without at least partially depending on operation by a driver. It may be determined that the hybrid vehicle is in the traveling state having the low necessity to quickly increase the traveling torque of the hybrid vehicle, during execution of the automatic driving controller.

The control system as described above may further include a following travel controller that causes the hybrid vehicle to travel in a vehicle following mode in which the hybrid vehicle follows a vehicle traveling ahead. It may be determined that the hybrid vehicle is in the traveling state having the low necessity to quickly increase the traveling torque of the hybrid vehicle, during execution of the following travel controller.

The control system as described above may further include an automatic driving controller that controls traveling of the hybrid vehicle to cause the hybrid vehicle to travel in an automatic driving mode, without at least partially depending on operation by a driver. It may be determined that the hybrid vehicle is in the traveling state having the low necessity to quickly increase the traveling torque of the hybrid vehicle, when required traveling torque during traveling in the automatic driving mode is smaller than a predetermined value set in advance.

The control system as described above may further include a following travel controller that causes the hybrid vehicle to travel in a vehicle following mode in which the hybrid vehicle follows a vehicle traveling ahead. It may be determined that the hybrid vehicle is in the traveling state having the low necessity to quickly increase the traveling torque of the hybrid vehicle, when required traveling torque during traveling in the vehicle following mode is smaller than a predetermined value set in advance.

The control system may further include a controller that determines whether a condition under which the emission amount of the particulate matter is likely to increase is satisfied, based on whether one or both of a first condition that an engine coolant temperature of the engine is lower than a predetermined temperature set in advance, and a second condition that an engine stop time from a point in time at which the engine is stopped is equal to or longer than a predetermined time set in advance, are satisfied.

In the control system as described above, the first engine starting unit may execute injection and ignition of fuel when an engine speed reaches a predetermined rotational speed set in advance.

In the control system as described above, the engine starting units may further include at least one of: (a) an ignition engine starting unit that injects fuel into a combustion chamber in a condition where a piston of the engine is stopped at a position on an expansion stroke, and ignites the fuel, (b) a compression-stroke engine starting unit that rotates the engine by use of the motor while injecting the fuel, from a condition where the piston of the engine is stopped at a position on a compression stroke, and performs ignition when the piston passes a top dead center, and (c) an intake-stroke engine starting unit that rotates the engine by use of the motor while injecting the fuel, from a condition where the piston of the engine is stopped at a position on an intake stroke, and performs ignition when the piston passes the top dead center. One of the ignition engine starting unit, the compression-stroke engine starting unit, and the intake-stroke engine starting unit starts the engine, when the hybrid vehicle is in a traveling state in which the traveling torque needs to be quickly increased.

With the control system as described above, when the hybrid vehicle is in the traveling state having a low necessity to quickly increase traveling torque, the first engine starting unit that curbs increase of the emission amount of particulate matter emitted during engine starting starts the engine. In the traveling state having the low necessity to quickly increase the traveling torque, quick torque response is not required; therefore, in this case, the first engine starting unit that reduces the emission amount of the particular matter starts the engine, so that increase of the emission amount of the particulate matter emitted during engine starting can be curbed.

With the control system as described above, when the hybrid vehicle is traveling in the automatic driving mode, the vehicle is considered as being in the traveling state having a low necessity to quickly increase the traveling torque. Thus, when the engine is started during traveling in the automatic traveling mode, the first engine starting unit starts the engine, so that increase of the emission amount of the particulate matter emitted during engine starting can be cubed.

With the control system as described above, when the hybrid vehicle is traveling in the vehicle following mode, the vehicle is considered as being in the traveling state having a low necessity to quickly increase the traveling torque. Thus, when the engine is started during traveling in the vehicle following mode, the first engine starting unit starts the engine, so that increase of the emission amount of the particulate matter emitted during engine starting can be curbed.

With the control system as described above, when the hybrid vehicle is traveling in the automatic driving mode, and the required traveling torque during traveling in the automatic traveling mode is smaller than the predetermined value, the vehicle is considered as being in the traveling state having a low necessity to quickly increase the traveling torque. In this case, the first engine starting unit starts the engine, so that increase of the emission amount of the particulate matter emitted during engine starting can be curbed.

With the control system as described above, when the hybrid vehicle is traveling in the vehicle following mode, and the required traveling torque during following traveling is smaller than the predetermined value, the vehicle is considered as being in the traveling state having a low necessity to quickly increase the traveling torque. In this case, the first engine starting unit starts the engine, so that increase of the emission amount of the particulate matter emitted during engine starting can be curbed.

With the control system as described above, it is determined whether a condition under which the emission amount of the particulate matter is likely to increase is satisfied, based on one or both of the first condition that the engine coolant temperature of the engine is lower than the predetermined temperature, and the second condition that the engine stop time from a point in time at which the engine is stopped is equal to or longer than the predetermined time. Thus, when the condition is satisfied, the first engine starting unit starts the engine, so that increase of the emission amount of the particulate matter can be efficiently curbed.

With the control system as described above, the first engine starting unit executes injection and ignition of fuel when the engine speed reaches the predetermined rotational speed set in advance. Thus, airflow is generated in a combustion chamber of the engine, so that the fuel is less likely to be deposited on a wall of the combustion chamber, and the fuel is appropriately burned. As a result, increase of the emission amount of the particulate matter contained in the exhaust gas is curbed.

With the control system as described above, when the vehicle is in the traveling state in which the traveling torque needs to be quickly increased, one of the ignition engine starting unit, compression-stroke engine starting unit, and intake-stroke engine starting unit starts the engine, so that the torque response of engine torque is improved, and the drivability is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a view showing characteristics of each of a plurality of engine starting methods, and comparing the characteristics of the respective engine starting methods;

DETAILED DESCRIPTION OF EMBODIMENTS

Figure 1:
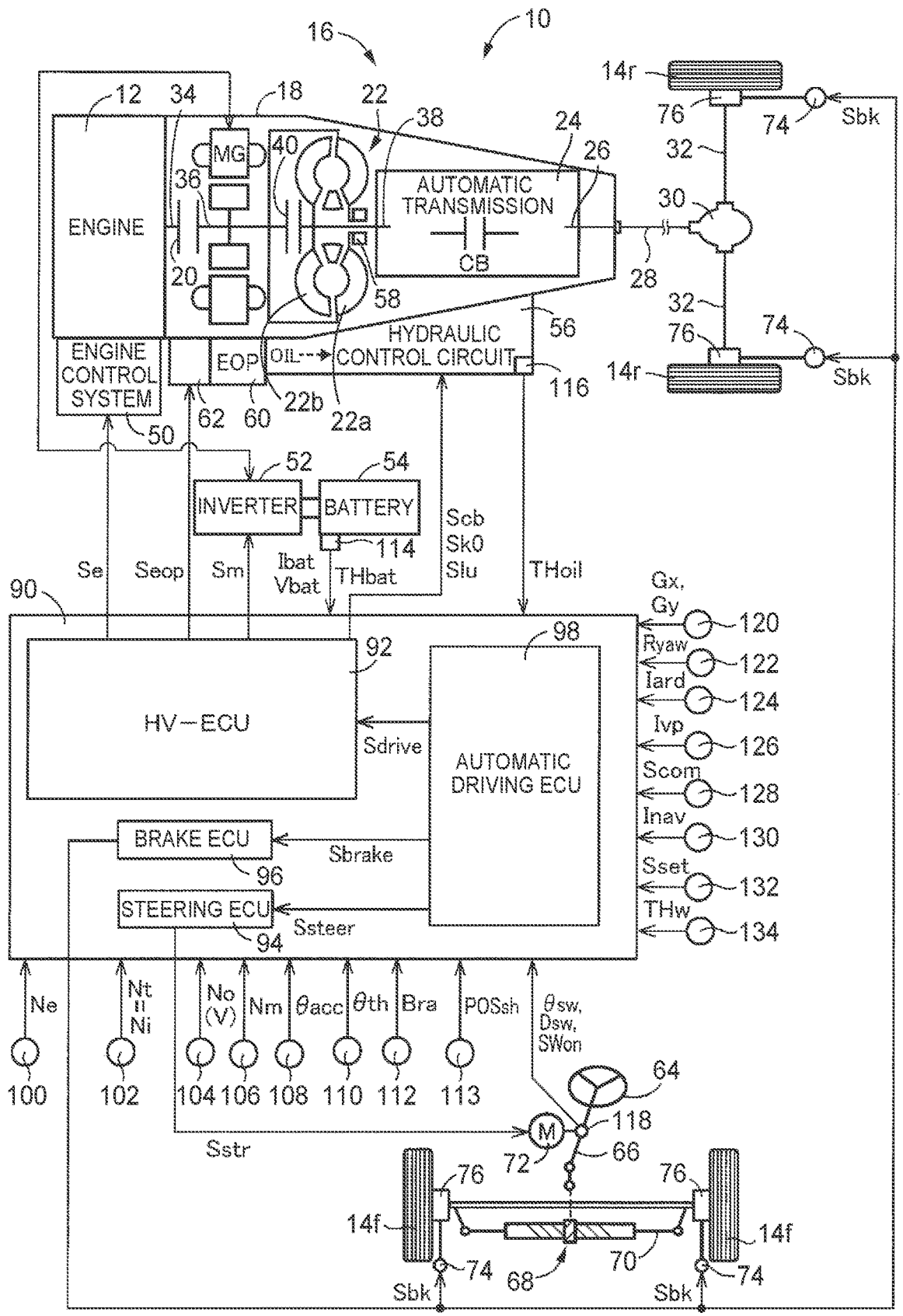
FIG. 1 is a view illustrating the schematic configuration of a vehicle to which the disclosure is applied, which view is also useful for describing input-output relationships in a control system for various controls in the vehicle.

Some embodiments of the disclosure will be described in detail with reference to the drawings. In the drawings showing the embodiments, parts or components are simplified or modified as needed, and the dimension ratios, shapes, etc. of the parts or components are not necessarily accurate.

First Embodiment

Referring to FIG. 1, the schematic configuration of a vehicle 10 to which the disclosure is applied will be described, and the input-output relationships in a control system for various controls in the vehicle 10 will also be described. In FIG. 1, the vehicle 10 is a hybrid vehicle having an engine 12 and a motor MG as driving force sources for propelling the vehicle 10. Also, the vehicle 10 includes rear wheels 14r as drive wheels, and a power transmission system 16 provided in a power transmission path between the engine 12 and the rear wheels 14r.

The engine 12 is a known internal combustion engine, such as a direct-injection type gasoline engine. The engine 12 is provided with an engine control system 50 including a throttle actuator, fuel injectors, ignition devices, and so forth, provided in the vehicle 10. With the engine control system 50 controlled by an electronic control unit 90 that will be described later, engine torque Te as output torque of the engine 12 is controlled. The engine 12 is configured to be able to start and stop (operate intermittently) according to the traveling state of the vehicle 10.

The motor MG is a rotating electric machine, or so-called "motor-generator", which functions as a motor that generates mechanical power from electric power, and also functions as a generator that generates electric power from mechanical power. The motor MG is connected to a battery 54 provided in the vehicle 10, via an inverter 52 provided in the vehicle 10. With the inverter 52 controlled by the electronic control unit 90 that will be described later, MG torque Tm as output torque of the motor MG is controlled. Where the direction of rotation of the motor MG is the same positive direction as that of the engine 12 during operation, for example, the MG torque Tm is power running torque when it is positive torque generated during acceleration, and is regenerative torque when it is negative torque generated during deceleration. More specifically, the motor MG generates power for traveling, using electric power supplied from the battery 54 via the inverter 52, in place of or in addition to power generated by the engine 12. Also, the motor MG generates electric power, using power of the engine 12 and driven power received from the rear wheels 14r side. The electric power generated by the motor MG is stored in the battery 54 via the inverter 52. The battery 54 is a power storage device that supplies and receives electric power to and from the motor MG. The electric power is equivalent to electric energy when they are not particularly distinguished from each other. The power is equivalent to torque or force when they are not particularly distinguished from each other.

The power transmission system 16 includes a K0 clutch 20, torque converter 22, automatic transmission 24, etc. in a case 18 as a non-rotating member mounted on a vehicle body. The K0 clutch 20 is a clutch provided between the engine 12 and the motor MG, in the power transmission path between the engine 12 and the rear wheels 14r. The torque converter 22 is connected to the engine 12 via the K0 clutch 20. The automatic transmission 24 is connected to the torque converter 22, and lies on the power transmission path between the torque converter 22 and the rear wheels 14r. Each of the torque converter 22 and the automatic transmission 24 provides a part of the power transmission path between the engine 12 and the rear wheels 14r. The power transmission system 16 also includes a propeller shaft 28 connected to a transmission output shaft 26 as an output rotating member of the automatic transmission 24, a differential device 30 connected to the propeller shaft 28, a pair of drive shafts 32 connected to the differential device 30, and so forth. The power transmission system 16 also includes an engine connecting shaft 34 that connects the engine 12 with the K0 clutch 20, a motor connecting shaft 36 that connects the K0 clutch 20 with the torque converter 22, and so forth.

In the case 18, the motor MG is connected to the motor connecting shaft 36, such that power can be transmitted therebetween. The motor MG is connected to the power transmission path between the engine 12 and the rear wheels 14r, in particular, a power transmission path between the K0 clutch 20 and the torque converter 22, such that power can be transmitted therebetween. Namely, the motor MG is connected to the torque converter 22 and the automatic transmission 24 in a power transmittable manner, with no intervention of the K0 clutch 20. In other words, each of the torque converter 22 and the automatic transmission 24 provides a part of the power transmission path between the motor MG and the rear wheels 14r. Each of the torque converter 22 and the automatic transmission 24 transmits drive power from each of the engine 12 and the motor MG to the rear wheels 14r.

The torque converter 22 includes a pump impeller 22a connected to the motor connecting shaft 36, and a turbine wheel 22b connected to a transmission input shaft 38 as an input rotating member of the automatic transmission 24. The pump impeller 22a is connected to the engine 12 via the K0 clutch 20, and is also directly connected to the motor MG. The pump impeller 22a is an input member of the torque converter 22, and the turbine wheel 22b is an output member of the torque converter 22. The motor connecting shaft 36 is also an input rotating member of the torque converter 22. The transmission input shaft 38 is also an output rotating member of the torque converter 22 which is formed integrally with a turbine shaft that is rotated or driven by the turbine wheel 22b. The torque converter 22 is a hydraulic power transmission device that transmits driving force from each of the driving force sources (engine 12, motor MG) to the transmission input shaft 38 via fluid. The torque converter 22 includes a LU clutch 40 that connects the pump impeller 22a with the turbine wheel 22b. The LU clutch 40 is a direct-coupling clutch, or so-called lock-up clutch, which connects the input and output rotating members of the torque converter 22.

To change the operating state, or controlled state, of the LU clutch 40, LU clutch torque Tlu as the torque capacity of the LU clutch 40 is changed by a regulated LU oil pressure PRlu supplied from a hydraulic control circuit 56 provided in the vehicle 10. Examples of the controlled state of the LU clutch 40 include a fully released state in which the LU clutch 40 is released, a slipping state in which the LU clutch 40 is engaged while slipping, and a fully engaged state in which the LU clutch 40 is engaged. When the LU clutch 40 is placed in the fully released state, the torque converter 22 is placed in a torque converting state in which the torque amplifying function is obtained. When the LU clutch 40 is placed in the fully engaged state, the torque converter 22 is placed in a lock-up state in which the pump impeller 22a and the turbine wheel 22b are rotated as a unit.

The automatic transmission 24 is a known planetary gear type automatic transmission including one or two or more planetary gear sets (not shown), and two or more engagement devices CB, for example. The engagement devices CB are hydraulic frictional engagement devices, such as a multiple-disk or single-disk clutch or brake that is pressed by a hydraulic actuator, and a band brake tightened by a hydraulic actuator. In operation, CB torque Tcb as the torque capacity of each of the engagement devices CB is changed by a regulated CB oil pressure PRcb supplied from the hydraulic control circuit 56, so that the controlled state of the engagement device CB is switched between an engaged state and a released state, for example.

The automatic transmission 24 is a stepwise variable transmission having two or more gear positions of different speed ratios (or gear ratios) γat (=AT input rotational speed Ni/AT output rotational speed No), and any one of the gear positions is established when a selected one or more of the engagement devices CB is/are engaged. The gear position of the automatic transmission 24 is changed, namely, a selected one of the gear positions is established, by the electronic control unit 90 that will be described later, according to the accelerator operation by the driver, vehicle speed V, etc. The AT input rotational speed Ni is a rotational speed of the transmission input shaft 38, and the input rotational speed of the automatic transmission 24. The AT input rotational speed Ni is also the rotational speed of the output rotating member of the torque converter 22, and is equal to a turbine speed Nt as the output rotational speed of the torque converter 22. The AT input rotational speed Ni can be represented by the turbine speed Nt. The AT output rotational speed No is the rotational speed of the transmission output shaft 26, and the output rotational speed of the automatic transmission 24.

The K0 clutch 20 is a wet or dry frictional engagement device provided by a multiple-disk or single-disk clutch that is pressed by a clutch actuator (not shown), for example. When the clutch actuator is controlled by the electronic control unit 90, the controlled state of the K0 clutch 20 is switched between an engaged state and a released state. More specifically, K0 clutch torque Tk0 as the torque capacity of the K0 clutch 20 is changed by a K0 oil pressure PRk0 regulated by the hydraulic control circuit 56, so that the controlled state of the K0 clutch 20 is changed. In this embodiment, the K0 clutch torque Tk0 increases in proportion to the K0 oil pressure PRk0 of the K0 clutch 20.

Referring back to FIG. 1, when the K0 clutch 20 is in the engaged state, the pump impeller 22a and the engine 12 are rotated as a unit via the engine connecting shaft 34. Namely, the K0 clutch 20, when engaged, connects the engine 12 with the rear wheels 14r, such that power can be transmitted therebetween. On the other hand, when the K0 clutch 20 is in the released state, power transmission between the engine 12 and the pump impeller 22a is cut off. Namely, the K0 clutch 20, when released, disconnects the engine 12 from the rear wheels 14r. Since the motor MG is connected to the pump impeller 22a, the K0 clutch 20 functions as a clutch that is provided in a power transmission path between the engine 12 and the motor MG, and connects and disconnects the power transmission path, namely, as a clutch that connects and disconnects the engine 12 to and from the motor MG. Namely, the K0 clutch 20 is a connecting/disconnecting clutch which connects the engine 12 with the motor MG when engaged, and cuts off connection between the engine 12 and the motor MG when released.

In the power transmission system 16, when the K0 clutch 20 is engaged, power delivered from the engine 12 is transmitted from the engine connecting shaft 34 to the rear wheels 14r, via the K0 clutch 20, motor connecting shaft 36, torque converter 22, automatic transmission 24, propeller shaft 28, differential device 30, drive shafts 32, etc., in this order. Also, power delivered from the motor MG is transmitted from the motor connecting shaft 36 to the rear wheels 14r, via the torque converter 22, automatic transmission 24, propeller shaft 28, differential device 30, drive shafts 32, etc., in this order, irrespective of the controlled state of the K0 clutch 20.

The vehicle 10 includes a MOP 58 as a mechanical oil pump, EOP 60 as an electric oil pump, pump motor 62, and so forth. The MOP 58, which is connected to the pump impeller 22a, is rotated or driven by the driving force source(s) (engine 12, motor MG), and delivers hydraulic oil OIL for use in the power transmission system 16. The pump motor 62 is a motor exclusively provided for the EOP 60 so as to rotate or drive the EOP 60. The EOP 60 is rotated or driven by the pump motor 62, and delivers hydraulic oil OIL. The hydraulic oil OIL delivered by the MOP 58 and the EOP 60 is supplied to the hydraulic control circuit 56. The hydraulic control circuit 56 supplies the CB oil pressure PRcb, K0 oil pressure PRk0, LU oil pressure PRlu, etc., which are respectively regulated, using the hydraulic oil OIL delivered by the MOP 58 and/or the EOP 60, as the original pressure.

A steering wheel 64 provided in the vehicle 10 is operated by the driver. When the driver rotates the steering wheel 64, the rotation is transmitted to a gear box 68, via a steering shaft 66 connected to the steering wheel 64. In the gear box 68, the rotation of the steering shaft 66 is converted into lateral motion of tie rods 70 connected to the gear box 68, and the angles of right and left front wheels 14f are changed due to the lateral movements of the tie rods 70. Also, an electric motor 72 that functions as an electric power steering system that assists in operation of the driver is operatively connected to the steering shaft 66. The electric motor 72 serves not only to assist in operation of the driver, but is also able to change the angles of the right and left front wheels 14f, by rotating the steering shaft 66, during traveling in an automatic driving mode.

Each of the right and left front wheels 14f and rear wheels 14r is provided with a wheel brake 76 to which braking force Fbr is applied when the oil pressure Pbr of hydraulic oil supplied to a brake hydraulic cylinder 74 of each wheel is regulated. The oil pressure Pbr of the hydraulic oil in the brake hydraulic cylinder 74 increases in proportion to the force applied to the brake pedal by the driver, and the braking force Fbr generated in the wheel brake 76 also increases in proportion to the force applied to the brake pedal. Also, the oil pressure Pbr of the hydraulic oil supplied to the brake hydraulic cylinder 74 is controlled according to a brake signal Sbk output from a brake ECU 96 that will be described later, and the braking force Fbr can be applied to the front wheels 14f and rear wheels 14r, according to the traveling state of the vehicle 10. Also, while the vehicle is traveling in the automatic driving mode, the oil pressure Pbr of the hydraulic oil of each brake hydraulic cylinder 74 is controlled based on the brake signal Sbk output from the brake ECU 96, so that the braking force Fbr is applied as needed to the front wheels 14f and rear wheels 14r, according to the traveling state of the vehicle 10.

The vehicle 10 includes a plurality of ECUs that constitutes the electronic control unit 90 (control system) that controls each part of the vehicle 10. The electronic control unit 90 receives various signals, etc. based on detection values obtained by various sensors, etc. provided in the vehicle 10. The sensors, etc. include, for example, an engine speed sensor 100, turbine speed sensor 102, output rotational speed sensor 104, MG speed sensor 106, accelerator position sensor 108, throttle opening sensor 110, brake pedal sensor 112, shift position sensor 113, battery sensor 114, oil temperature sensor 116, steering sensor 118, G sensor 120, yaw rate sensor 122, vehicle surrounding information sensor 124, vehicle position sensor 126, antenna 128 for external network communications, navigation system 130, driving assistance setting switches 132, and engine coolant temperature sensor 134. The above-indicated various signals include, for example, the engine speed Ne as the rotational speed of the engine 12, turbine speed Nt that is equal to the AT input rotational speed Ni, AT output rotational speed No corresponding to the vehicle speed V, MG speed Nm as the rotational speed of the motor MG, accelerator pedal stroke $\theta$acc as the amount of accelerator operation by the driver, which represents the magnitude of the accelerating operation by the driver, throttle opening $\theta$th as the opening of an electronic throttle valve, brake operation amount Bra representing the magnitude of the driver's operation to depress the brake pedal, operation position POSsh of a shift lever, battery temperature THbat, battery charge/discharge current that, and battery voltage Vbat of the battery 54, hydraulic oil temperature THoil as the temperature of the hydraulic oil OIL in the hydraulic control circuit 56, steering angle θsw and steering direction Dsw of the steering wheel 64, steering ON signal SWon as a signal indicating a condition where the steering wheel 64 is gripped by the driver, longitudinal acceleration Gx and lateral acceleration Gy of the vehicle 10, yaw rate Ryaw as a rotation angular velocity about the vertical axis of the vehicle 10, vehicle surrounding information lard, position information Ivp, communication signal Scom, navigation information Inavi, driving assistance setting signal Sset as a signal indicating settings by the driver under driving assistance control, such as automatic driving control or following control, engine coolant temperature THw, and so forth.

The vehicle surrounding information sensor 124 includes at least one of a lidar, radar, and vehicle-mounted camera, for example, and directly obtains information concerning a road on which the vehicle is traveling, and information concerning objects that are present around the vehicle. The lidar may consist of two or more lidars that respectively detect a vehicle (leading vehicle) traveling ahead of the vehicle 10 and an object(s) in front of the vehicle 10, object(s) on one side of the vehicle 10, and a vehicle traveling behind the vehicle 10 and object(s) behind the vehicle 10, for example, or may be a single lidar that detects objects all around the vehicle 10. The lidar outputs the information concerning the vehicles and objects thus detected, as vehicle surrounding information lard. The radar may consist of two or more radars that respectively detect a vehicle (leading vehicle) traveling ahead of the vehicle 10 and an object(s) in front of the vehicle 10, and a vehicle traveling behind the vehicle 10 and object(s) behind the vehicle 10, for example. The radar outputs the information concerning the vehicles and objects thus detected, as vehicle surrounding information lard. The information obtained by the lidar and radar includes the distance from the front vehicle (leading vehicle) detected, the vehicle speed of the leading vehicle, etc. The vehicle-mounted camera is a monocular camera or a stereo camera that captures an image in front of or behind the vehicle 10, for example, and outputs captured image information as the vehicle surrounding information lard. The captured image information includes information, such as lanes of the road on which the vehicle is traveling, traffic signs along the road, parking space, and other vehicles, pedestrians, and obstacles on or along the road.

The vehicle position sensor 126 includes a Global Positioning System (GPS) antenna, for example. The position information Ivp includes own-vehicle position information as information indicating the current position of the vehicle 10 on the ground or on a map, based on a GPS signal (orbital signal) generated by a GPS satellite.

The navigation system 130 is a known navigation system having a display, speaker, etc. The navigation system 130 specifies the own-vehicle position on map data stored in advance, based on the position information Ivp. The navigation system 130 displays the own-vehicle position on a map displayed on the display. When a destination is entered, the navigation system 130 computes a travel path from a place of departure to the destination, and indicates the travel path, etc. to the driver, via the display, speaker, or the like. The navigation information Inavi includes map information, such as road information and facility information, based on map data stored in advance in the navigation system 130, for example. The road information includes the type of each road, such as an urban road, suburban road, mountain road, or an automobile expressway or highway, branching or joining of roads, gradient of each road, and speed limits. The facility information includes the types, locations, names, etc. of spots, such as supermarkets, shops, restaurants, parking places, parks, repair shop for the vehicle 10, home, and service areas on expressways. The service areas are spots on expressways, for example, having facilities for parking, meals, and refueling.

The driving assistance setting switches 132 include an automatic driving selection switch for executing traveling in the automatic driving mode, a cruise switch for executing following traveling (cruising), a switch for setting the vehicle speed during following traveling, a switch for setting an inter-vehicle distance between the own vehicle and a leading vehicle during following traveling, a switch for causing the vehicle to travel while keeping set lanes, and so forth.

The communication signal Scom includes road traffic information transmitted to or received from a center as an exterior system, such as a road traffic information communication system, for example, and/or vehicle-to-vehicle communication information directly transmitted to and received from another vehicle present in the vicinity of the vehicle 10 with no intervention of the center. The road traffic information includes information on road congestion, accidents, roadworks, required time, parking places, and so forth. The vehicle-to-vehicle communication information includes vehicle information, travel information, traffic environment information, and so forth. The vehicle information includes information indicating the vehicle type, such as a passenger car, truck, or motorcycle. The travel information includes information, such as the vehicle speed V, position information, information on operation of the brake pedal, information on flashing of a turn signal lamp, and information on flashing of hazard lamps, for example. The traffic environment information includes information on road congestion, roadworks, etc., for example.

Various command signals are generated from the electronic control unit 90, to respective devices included in the vehicle 10. The devices include, for example, the engine control system 50, inverter 52, hydraulic control circuit 56, electric motor 72, brake hydraulic cylinders 74, EOP 60, and so forth. The above-mentioned command signals include, for example, an engine control command signal Se for controlling the engine 12, MG control command signal Sm for controlling the motor MG, hydraulic control command signal Scb for controlling the operating state of each of the engagement devices CB, hydraulic control command signal Sk0 for controlling the operating state of the K0 clutch 20, hydraulic control command signal Slu for controlling the operating state of the LU clutch 40, steering control command signal Sstr for controlling steering of the wheels (in particular, the front wheels 14f), brake signal Sbk for controlling the braking force Fbr (or braking torque Tbr) applied by the wheel brakes 76, EOP drive command signal Seop for controlling the drive state of the EOP 60, and so forth.

The electronic control unit 90 includes an HV-ECU 92, steering ECU 94, brake ECU 96, and automatic driving ECU 98.

The HV-ECU 92 has a function of controlling the engine 12, motor MG, K0 clutch 20, and automatic transmission 24, according to the traveling state of the vehicle, so that the vehicle generates the driving force requested by the driver, with the optimum fuel economy. The HV-ECU 92 outputs the engine control command signal Se for output control of the engine 12, MG control command signal Sm to the inverter 52 for drive control of the motor MG, hydraulic control command signal Scb for controlling the operating state of each engagement device CB, hydraulic control command signal Sk0 for controlling the operating state of the K0 clutch 20, hydraulic control command signal Slu for controlling the operating state of the LU clutch 40, EOP drive command signal Seop for controlling the drive state of the EOP 60, and so forth.

The steering ECU 94 has a function of generating assist force according to the steering angle θsw corresponding to the operation amount of the steering wheel 64 by the driver, and the vehicle speed V, by controlling the electric motor 72. When the driver operates the steering wheel 64, the steering ECU 94 outputs an assist command signal Sstr for generating the assist force according to the operation amount of the steering wheel 64, to the electric motor 72, so that the assist force is applied to the steering shaft 66, via the electric motor 72.

The brake ECU 96 has a function of generating the braking force Fbr according to the traveling state of the vehicle 10, by controlling the hydraulic pressure of each brake hydraulic cylinder 74. For example, when it is determined from the speed of depression of the brake pedal, for example, that a sudden brake is applied to the vehicle, the brake ECU 96 outputs the brake signal Sbk for increasing the braking force Fbr by increasing the oil pressures Pbr of the brake hydraulic cylinders 74. During turning of the vehicle, the brake ECU 96 outputs the brake signal Sbk to the brake hydraulic cylinder 74, so as to generate braking force Fbr for curbing sideslip or skidding of the vehicle 10.

When the vehicle 10 is switched to the automatic driving mode, the automatic driving ECU 98 controls the vehicle 10, based on a destination set in advance, the current position, etc., so as to automatically drive the vehicle 10 toward the destination, without depending on operation by the driver. Namely, the automatic driving ECU 98 has a function of automatically driving the vehicle 10. Also, the automatic driving ECU 98 has a function of performing following travel control, by causing the vehicle 10 to travel while following a leading vehicle traveling ahead, when the vehicle 10 is switched to the vehicle following mode.

The automatic driving ECU 98 receives various kinds of information concerning the vicinity of the vehicle 10, including the presence of obstacles around the vehicle 10, and a vehicle or vehicles traveling ahead of, behind, to the left of, and to the right of the vehicle 10, for example, from the vehicle surrounding information sensor 124. Also, the automatic driving ECU 98 receives as needed various kinds of information representing vehicle conditions, such as the engine speed Ne of the engine 12, throttle opening θth, MG speed Nm of the motor MG, vehicle speed V, and steering angle θsw and steering direction Dsw of the steering wheel 64, from various sensors.

The automatic driving ECU 98 outputs a driving force command signal Sdrive for adjusting driving force during traveling in the automatic driving mode and vehicle following mode, to the HV-ECU 92, a steering command signal Ssteer for adjusting the steering angle θsw of the steering wheel 64 during traveling in the automatic driving mode and vehicle following mode, to the steering ECU 94, and a braking force command signal Sbrake for adjusting the braking force Fbr of each wheel brake 76 during traveling in the automatic driving mode and vehicle following mode, to the brake ECU 96.

Figure 2:
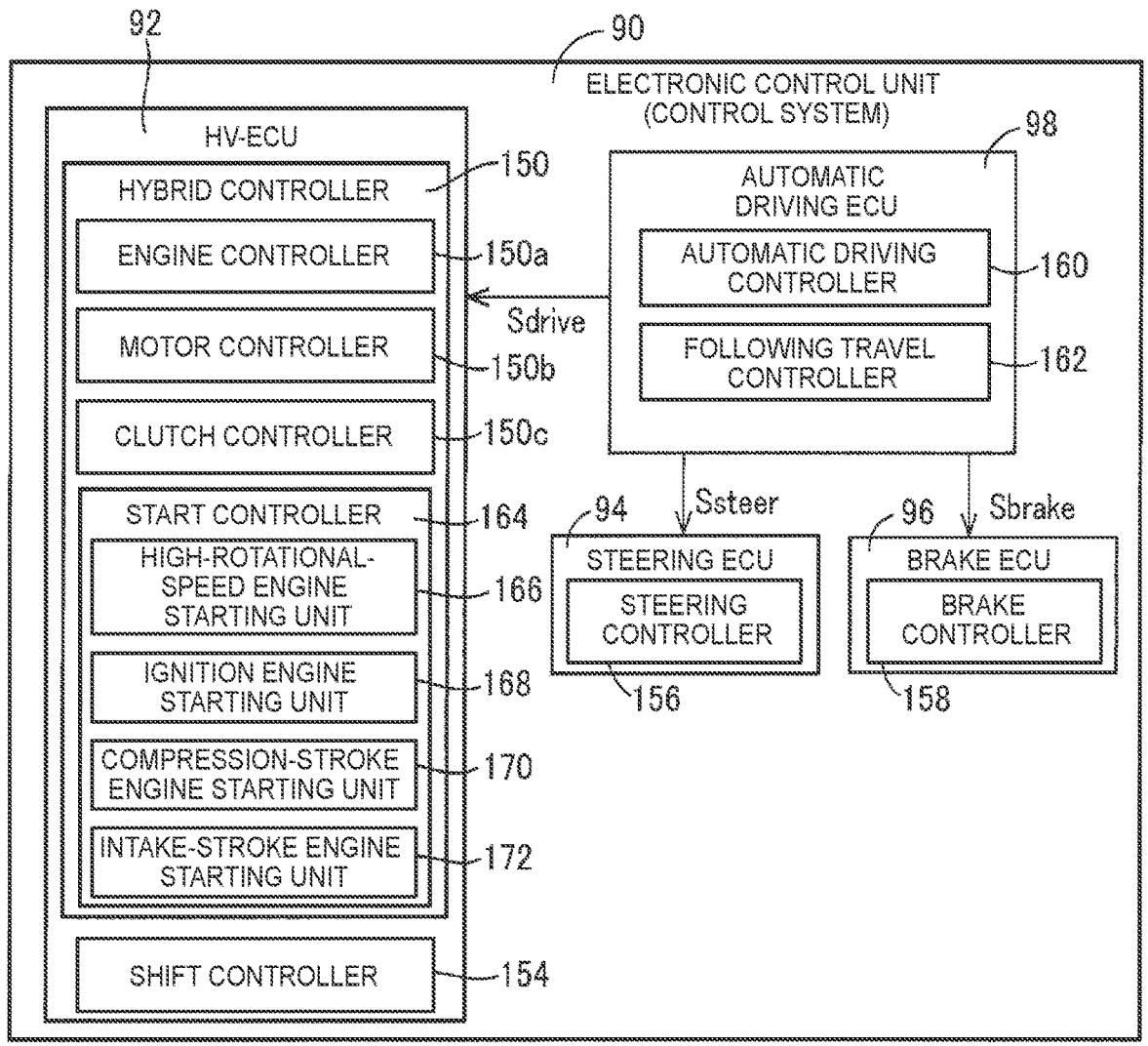
FIG. 2 is a functional block diagram useful for describing a principal part of control functions of each ECU that constitutes an electronic control unit of FIG. 1.

FIG. 2 is a functional block diagram useful for describing a principal part of control functions of respective ECUs that constitute the electronic control unit 90 of FIG. 1. The electronic control unit 90 includes the HV-ECU 92 for hybrid drive control on the engine 12, motor MG, etc., steering ECU 94 that controls the electric motor 72 that constitutes the electric power steering system, brake ECU 96 that controls the brake hydraulic cylinders 74 that adjust the braking force Fbr of the wheel brakes 76, and automatic driving ECU 98 for executing traveling in the automatic driving mode (automatic driving control) that will be described later. Each ECU includes a so-called microcomputer having a central processing unit (CPU), random access memory (RAM), read-only memory (ROM), input-output interface, etc., for example, and the CPU performs various controls on the vehicle 10, by performing signal processing according to programs stored in the ROM in advance, while utilizing the temporary storage function of the RAM.

The HV-ECU 92 functionally includes a hybrid controller 150 for implementing hybrid traveling, and a shift controller 154 for performing shift control on the automatic transmission 24. The steering ECU 94 functionally includes a steering controller 156 for adjusting the steering angle θsw of the steering wheel 64 by controlling the electric motor 72. The brake ECU 96 functionally includes a brake controller 158 for adjusting the braking force Fbr of each wheel, by controlling the oil pressure Pbr of the hydraulic oil of the brake hydraulic cylinder 74 included in each wheel (of the front wheels 14f and rear wheels 14r). The automatic driving ECU 98 functionally includes an automatic driving controller 160 for implementing automatic driving of the vehicle 10, and a following travel controller 162 for implementing following traveling.

The hybrid controller 150 includes a function as an engine controller 150a for controlling operation of the engine 12, a function as a motor controller 150b for controlling operation of the motor MG via the inverter 52, and a function as a clutch controller 150c for controlling the operating state of the K0 clutch 20. Through these control functions, the hybrid controller 150 performs hybrid drive control, etc. on the engine 12 and the motor MG.

The hybrid controller 150 calculates a travel requirement made by the driver on the vehicle 10, by applying the accelerator pedal stroke θacc and the vehicle speed V to a travel requirement map, for example. The travel requirement map is a predetermined relationship that is empirically or computationally obtained in advance and stored. The travel requirement is, for example, required traveling torque Trdem of the rear wheels 14r. The required traveling torque Trdem [Nm] is, from a different point of view, required traveling power Prdem [W] at the vehicle speed V. As the travel requirement, the required driving force Frdem [N] at the rear wheels 14r, required AT output torque of the transmission output shaft 26, or the like, may also be used. In calculation of the travel requirement, the AT output rotational speed No, or the like, may be used, in place of the vehicle speed V.

The hybrid controller 150 outputs the engine control command signal Se for controlling the engine 12, and the MG control command signal Sm for controlling the motor MG, so as to achieve the required traveling torque Trdem, in view of a transmission loss, accessories load, speed ratio γat of the automatic transmission 24, chargeable power Win and dischargeable power Wout of the battery 54, etc. The engine control command signal Se is, for example, a command value of engine power Pe as power of the engine 12 that generates engine torque Te at the engine speed Ne at that time. The MG control command signal Sm is, for example, a command value of consumed electric power Wm of the motor MG that generates MG torque Tm at the MG speed Nm at that time.

The chargeable power Win of the battery 54 is the maximum chargeable power that specifies the limit of input power of the battery 54, and indicates the input limit of the battery 54. The dischargeable power Wout of the battery 54 is the maximum dischargeable power that specifies the limit of output power of the battery 54, and indicates the output limit of the battery 54. The chargeable power Win and dischargeable power Wout of the battery 54 are calculated by the electronic control unit 90, based on the battery temperature THbat and the charge state value SOC [%] corresponding to the amount (remaining amount) of charge of the battery 54, for example. The charge state value SOC of the battery 54 indicates the state of charge of the battery 54, and is calculated by the electronic control unit 90, based on the battery charge/discharge current Ibat and the battery voltage Vbat, for example.

When the required traveling torque Trdem can be provided solely by the output of the motor MG, the hybrid controller 150 sets the traveling mode to a motor traveling (=EV traveling) mode. In the EV traveling mode, the hybrid controller 150 performs EV traveling, using only the motor MG as the driving force source, with the K0 clutch 20 placed in the released state. On the other hand, when the required traveling torque Trdem cannot be provided unless at least the output of the engine 12 is used, the hybrid controller 150 sets the traveling mode to an engine traveling mode, or hybrid traveling (=HV traveling) mode. In the HV traveling mode, the hybrid controller 150 performs engine traveling or HV traveling, using at least the engine 12 as the driving force source, with the K0 clutch 20 placed in the engaged state. Meanwhile, when the charge state value SOC of the battery 54 is smaller than a predetermined engine start threshold value, or the engine 12 needs to be warmed up, for example, the hybrid controller 150 establishes the HV traveling mode even when the required traveling torque Trdem can be provided solely by the output of the motor MG. The engine start threshold value is a predetermined threshold value used for determining that the charge state value SOC is at such a level that the engine 12 needs to be forced to start, to charge the battery 54. Thus, the hybrid controller 150 performs intermittent operation, by automatically stopping the engine 12 during HV traveling, restarting the engine 12 after engine stop, and starting the engine 12 during EV traveling, based on the required traveling torque Trdem, etc. In this manner, the hybrid controller 150 switches the traveling mode between the EV traveling mode and the HV traveling mode.

The shift controller 154 makes a shift determination on the automatic transmission 24, using a shift map indicating a predetermined relationship, for example, and outputs a CB hydraulic control command signal Scb for executing shift control of the automatic transmission 24, to the hydraulic control circuit 56, as needed. The shift map indicates a predetermined relationship having shift lines used for determining gearshift of the automatic transmission 24, on a two-dimensional coordinate system having the vehicle speed V and the required traveling torque Trdem as variables, for example. In the shift map, the AT output rotational speed No, or the like, may be used in place of the vehicle speed V, or the required driving force Frdem, accelerator pedal stroke θacc, throttle opening θth, or the like, may be used in place of the required traveling torque Trdem.

The steering controller 156 controls the electric motor 72, to generate assist force according to the amount of operation of the steering wheel 64 by the driver and the vehicle speed V. While the vehicle is traveling in the automatic driving mode, the steering controller 156 adjusts the steering angle θsw, based on the steering command signal Ssteer for adjusting the steering angle θsw of the steering wheel 64, which signal is generated from the automatic driving ECU 98.

The brake controller 158 controls the oil pressure Pbr of the hydraulic oil of each brake hydraulic cylinder 74, to an oil pressure value corresponding to the brake operation amount Bra of the brake pedal, so as to generate braking force Fbr in each wheel (of the front wheels 14f and rear wheels 14r). Also, while the vehicle is turning, for example, the brake controller 158 applies braking force Fbr to a given wheel, so as to curb sideslip or skidding of the vehicle 10. Also, while the vehicle is traveling in the automatic driving mode, the brake controller 158 adjusts the oil pressure Pbr of the hydraulic oil of the brake hydraulic cylinder 74 provided in each wheel, or the braking force Fbr of each wheel, based on the braking force command signal Sbrake for adjusting the braking force Fbr of the wheel brake 76, which signal is generated from the automatic driving ECU 98.

When the automatic driving selection switch for switching the traveling mode to the automatic driving mode is pressed, the automatic driving controller 160 controls the vehicle 10 without depending on operation by the driver, and starts automatic driving control to run the vehicle 10 in the automatic driving mode. The automatic driving controller 160 calculates various required values (target values) as needed, so that the vehicle 10 can travel appropriately, in view of the road information based on map information, etc., various kinds of information concerning the vicinity of the vehicle 10 detected by the vehicle surrounding information sensor 124, and various kinds of information representing vehicle conditions (such as the engine speed Ne) detected by various sensors (such as the engine speed sensor 100). The above-mentioned required values include the required traveling torque Trdem as the travel requirement of the vehicle 10, steering angle θsw of the steering wheel 64, the braking force Fbr of each wheel brake 76, and so forth. Once the automatic driving controller 160 calculates the various required values, it outputs commands for running the vehicle 10, using the calculated required values as targets, to the hybrid controller 150, shift controller 154, steering controller 156, and brake controller 158.

When the automatic driving controller 160 calculates the required traveling torque Trdem of the vehicle 10, during traveling in the automatic driving mode, it outputs the driving force command signal Sdrive for generating the calculated required traveling torque Trdem, to the HV-ECU 92. In response to the signal Sdrive, the hybrid controller 150 controls the engine 12, motor MG, and K0 clutch 20, so that the required traveling torque Trdem thus calculated is generated from the rear wheels 14r as drive wheels. Also, the shift controller 154 cooperates with the hybrid controller 150 to control gearshift of the automatic transmission 24, so that the required traveling torque Trdem thus calculated is generated from the rear wheels 14r.

When the automatic driving controller 160 calculates a required value θwdem of the steering angle θsw of the steering wheel 64, it outputs the steering command signal Ssteer for controlling the steering angle θsw of the steering wheel 64 to the calculated required value θwdem, to the steering ECU 94. In response to the signal Ssteer, the steering controller 156 drives the electric motor 72, while controlling the electric motor 72 to make the steering angle θsw of the steering wheel 64 equal to the required value θwdem.

When the automatic driving controller 160 calculates a required value Fbrdem of the braking force Fbr of each wheel brake 76, it outputs the braking force command signal Sbrake for controlling the braking force Fbr of each wheel brake 76 to the required value Fbrdem thus calculated, to the brake ECU 96. In response to the signal Sbrake, the brake controller 158 drives the brake hydraulic cylinder 74, so that the braking force Fbr of the wheel brake 76 becomes equal to the required value Fbrdem. Thus, the automatic driving controller 160 cooperates with the hybrid controller 150, shift controller 154, steering controller 156, and brake controller 158, to cause the vehicle 10 to travel in the automatic driving mode, namely, to perform automatic drive control.

When a following travel selection switch for switching the traveling mode to the following travel mode is pressed, the following travel controller 162 executes following traveling by controlling the vehicle 10 to travel while following a vehicle (leading vehicle) that travels ahead. For example, when a leading vehicle traveling ahead is detected, the following travel controller 162 calculates the required traveling torque Trdem with which an appropriate inter-vehicle distance can be maintained in accordance with change in the vehicle speed of the leading vehicle, and outputs the driving force command signal Sdrive for generating the required traveling torque Trdem thus calculated, to the HV-ECU 92. In response to the signal Sdrive, the hybrid controller 150 and the shift controller 154 control the engine 12, motor MG, K0 clutch 20, and automatic transmission 24, so that the required traveling torque Trdem thus calculated is generated from the rear wheels 14r.

When no leading vehicle traveling ahead is detected, the following travel controller 162 controls the vehicle 10 so that it travels at a vehicle speed that is set in advance for following traveling. The following travel controller 162 calculates the required traveling torque Trdem, based on a difference between the vehicle speed (target vehicle speed) for following traveling and the current vehicle speed V, and outputs the driving force command signal Sdrive for generating the required traveling torque Trdem thus calculated, to the HV-ECU 92.

When a large decelerating force is required, such as when the leading vehicle that travels ahead is suddenly decelerated, the following travel controller 162 calculates the required value Fbrdem of the braking force Fbr of each wheel brake 76, and outputs the braking force command signal Sbrake for controlling the braking force Fbr of each wheel brake 76 to the required value Fbrdem thus calculated, to the brake ECU 96. In response to the signal Sbrake, the brake controller 158 controls the oil pressure Pbr of the hydraulic oil of the brake hydraulic cylinder 74, to control the braking force Fbr of each wheel brake 76 to the required value Fbrdem.

The hybrid controller 150 also functionally includes a start controller 164 that starts the engine 12, when it is determined, based on change of the traveling state, that the traveling mode is switched from the motor traveling mode to the hybrid traveling mode (namely, when it is determined that the engine 12 is to be started), or when it is determined that the engine 12 is to be started, because of reduction in the charge state value SOC of the battery 54 or warm-up, for example.

When it is determined that the engine 12 is to be started, the start controller 164 selects one of engine starting methods that will be described later, and starts the engine 12 by the selected engine starting method. The start controller 164 functionally includes a plurality of engine starting units for starting the engine 12, more specifically, a high-rotational-speed engine starting unit 166, ignition engine starting unit 168, compression-stroke engine starting unit 170, and intake-stroke engine starting unit 172. The start controller 164 causes any one of these engine starting units 166, 168, 170, 172 to start the engine 12, according to conditions of the vehicle 10.

The high-rotational-speed engine starting unit 166 executes fuel injection into a cylinder 200 (see FIG. 4) of the engine 12 and ignition, after raising the engine speed Ne of the engine 12 to a predetermined rotational speed Ne1 (e.g., about 600 rpm) set in advance. When the high-rotational-speed engine starting unit 166 receives a command to start the engine 12, it cooperates with the clutch controller 150c to engage the K0 clutch 20, and raises the engine speed Ne of the engine 12, by applying cranking torque Tcra for rotating the engine 12 from the motor MG. Also, when the engine speed Ne reaches the predetermined rotational speed Ne1, the high-rotational-speed engine starting unit 166 injects the fuel into a combustion chamber 202 in the cylinder 200 of the engine 12 and ignites the fuel, thereby to start the engine 12. The high-rotational-speed engine starting unit 166 corresponds to the first engine starting unit of the disclosure.

In the engine starting method (which will be called "high-rotational-speed starting") performed by the high-rotational-speed engine starting unit 166, by the time when the fuel is injected into the combustion chamber 202 in the cylinder 200 of the engine 12, airflow is generated in the combustion chamber 202 in the cylinder 200 of the engine 12; therefore, the fuel is less likely to be deposited on a wall of the combustion chamber 202 (see FIG. 4) of the engine 12, and the fuel is favorably burned when ignited. Accordingly, the amount of emission of particulate matter (which will be referred to as "PM") contained in exhaust gas is less likely or unlikely to be increased. Meanwhile, since the engine speed Ne is increased to the predetermined rotational speed Ne1, the torque response of the engine 12 is delayed. Also, the cranking torque Tcra that is transmitted from the motor MG and is required to raise the engine speed Ne is large; therefore, the traveling torque Tr that can be generated from the motor MG becomes relatively small. As a result, an EV region in which the vehicle can travel in the motor traveling mode is narrowed. In this connection, since the length of time for which the engine 12 is operated is increased, the fuel consumption amount is increased, resulting in deterioration of the fuel economy (increase of the fuel consumption amount).

Figure 3:
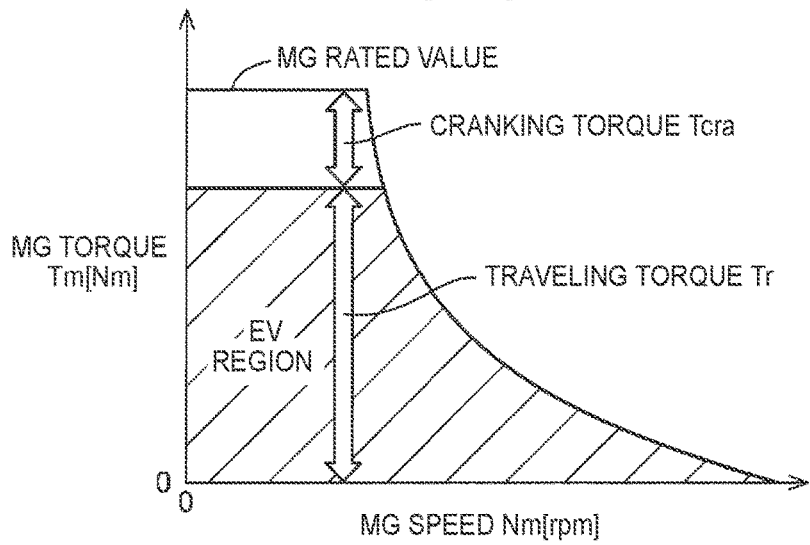
FIG. 3 is a view showing the output performance of a motor that functions as a driving force source of the vehicle.

FIG. 3 indicates the output performance of the motor MG. In FIG. 3, the horizontal axis indicates the MG speed Nm of the motor MG, and the vertical axis indicates the MG torque Tm of the motor MG. In FIG. 3, the MG rated value corresponds to a threshold value of the MG torque that can be generated by the motor MG, and the motor MG can be driven within the range of the MG rated value. When the engine is started, the motor MG needs to generate MG torque Tm as the sum (=Tr+Tcra) of the traveling torque Tr needed for traveling of the vehicle 10, and the cranking torque Tcra needed for rotating (cranking) the engine 12. Accordingly, as the cranking torque Tcra increases, the traveling torque Tr is relatively reduced in accordance with the increase of the cranking torque Tcra. Thus, as the cranking torque Tcra increases, the EV region (a hatched region in FIG. 3) in which the vehicle can travel in the motor traveling mode is narrowed, and the engine 12 needs to be quickly started. In other words, it becomes necessary to start the engine 12, before the sum of the traveling torque Tr and the cranking torque Tcra exceeds the rated value of the MG torque that can be generated by the motor MG; therefore, the engine 12 needs to be started earlier as the cranking torque Tcra increases, and, as a result, the EV region is narrowed.

The ignition engine starting unit 168 starts the engine 12, by injecting fuel into the combustion chamber 202 in the cylinder 200 in which the piston 216 is stopped at a position on the expansion stroke, as one of the cylinders 200 that constitute the engine 12, and igniting the fuel.

Figure 4:
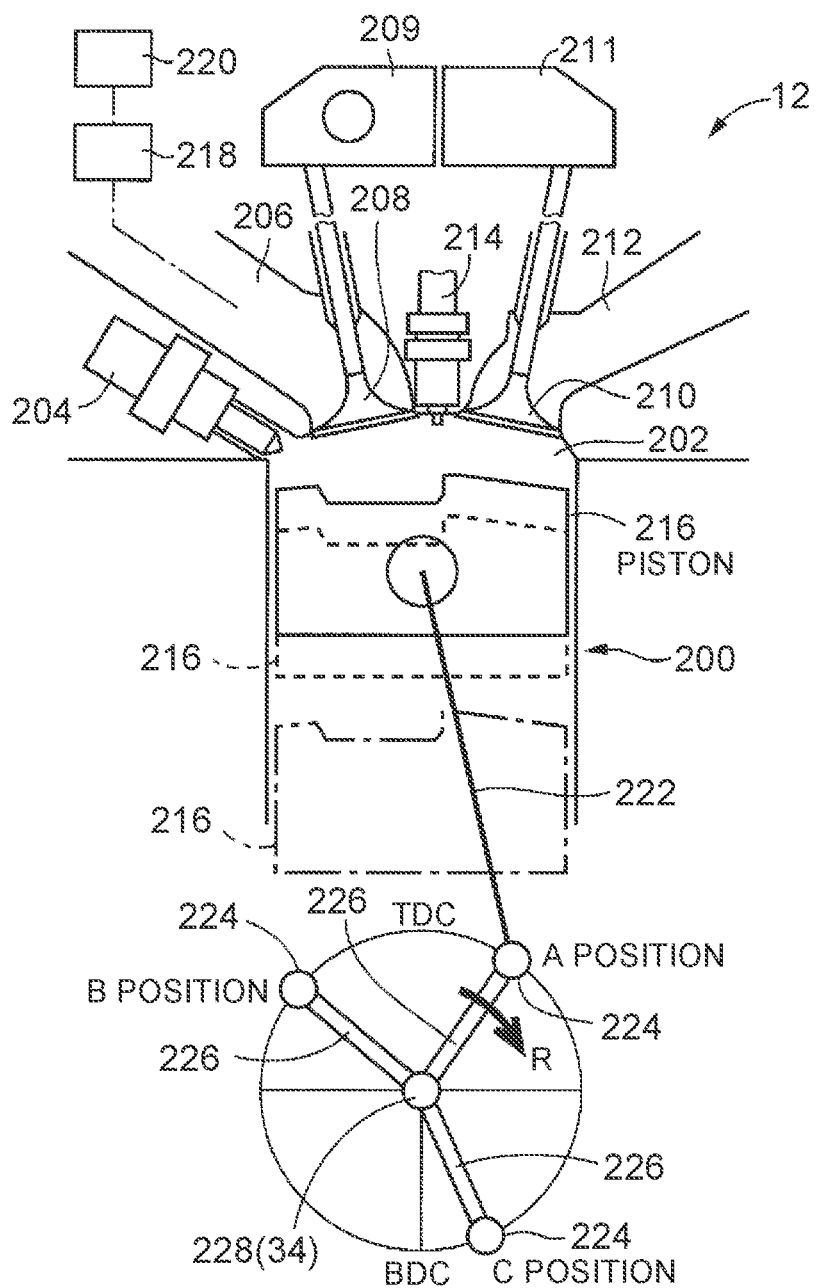
FIG. 4 is a view showing the structure of an engine of FIG. 1.

Referring to FIG. 4, the structure of the engine 12 will be described. The engine 12 is a V-six four-cycle direct-injection gasoline engine, for example. In the engine 12, gasoline (fuel) that is in the state of high-pressure fine particles is directly injected from a fuel injector 204, into the combustion chamber 202 formed in each cylinder 200.

In the engine 12, air flows from an intake passage 206 into the combustion chamber 202 via an intake valve 208, and exhaust gas is discharged from the combustion chamber 202 to an exhaust passage 212 via an exhaust valve 210. When an air-fuel mixture in the combustion chamber 202 is ignited by an ignition device 214 in predetermined timing, the mixture explodes and burns, to push the piston 216 downward.

The intake valve 208 is opened and closed by an intake valve drive unit 209 in the form of a cam mechanism included in the engine 12, when it is reciprocated in synchronism with rotation of a crankshaft 228 connected to the engine connecting shaft 34. Also, the exhaust valve 210 is opened and closed by an exhaust valve drive unit 211 in the form of a cam mechanism included in the engine 12, when it is reciprocated in synchronism with the crankshaft 228. The intake passage 206 is connected to an electronic throttle valve 220 as an intake air amount control valve via a surge tank 218, and the amount of intake air that flows from the intake passage 206 into the combustion chamber 202 is controlled according to the throttle opening θth of the electronic throttle valve 220.

The piston 216 is axially slidably fitted in the cylinder 200, and is connected to a crank pin 224 of the crankshaft 228 via a connecting rod 222. Also, the crank pin 224 and the crankshaft 228 are connected via a crank arm 226. With this arrangement, the crankshaft 228 is rotated in a direction indicated by arrow R, in accordance with reciprocating motion of the piston 216.

In the engine 12, each cylinder goes through four strokes, namely, the intake stroke, compression stroke, expansion (explosion) stroke, and exhaust stroke, while the crankshaft 228 makes two rotations, and the crankshaft 228 is continuously rotated as the four strokes are repeated. The pistons 216 are arranged to be shifted in phase, so that explosion and combustion take place in the respective pistons 216 of the engine 12 at different times.

Since the engine 12 is the direct-injection engine, the engine 12 can be started by ignition starting, namely, by directly injecting the fuel into the combustion chamber 202 in the cylinder 200 and igniting the fuel from the beginning of rotation of the engine 12. The ignition starting is an engine starting method by which the engine 12 is started by injecting the fuel into the combustion chamber 202 in the cylinder 200 by means of the fuel injector 204, in a condition where the crankshaft 228 is rotated by a given angle from the top dead center (TDC) after the compression stroke, and the piston 216 is stopped in an angular range of the expansion stroke in which both the intake valve 208 and the exhaust valve 210 are closed, and igniting the air-fuel mixture by means of the ignition device 214, so as to burn and explode the mixture in the cylinder 200. With the ignition starting, the engine 12 can be started without cranking by the motor MG. In FIG. 4, the position of the piston 216 indicated by a solid line, namely, the A position of the crank pin 224, corresponds to the position on the expansion stroke at which the piston 216 is rotated by the given angle from the top dead center. When the fuel is injected from the fuel injector 204 into the combustion chamber 202, and is ignited by the ignition device 214, in a condition where the piston 216 is located at the position indicated by the solid line, the fuel is burned in the combustion chamber 202, and explosion occurs, so that the piston 216 is pushed downward.

The ignition engine starting unit 168 starts the engine 12 by ignition starting as described above. The ignition engine starting unit 168 starts the engine 12 (ignition starting), by directly injecting the fuel into the combustion chamber 202 in the cylinder 200 (expansion stroke cylinder) in the angular range in which the piston 216 is on the expansions stroke (corresponding to the A position of the crank pin 224), as one of the cylinders 200 that constitute the engine 12, and igniting the fuel.

In the ignition starting executed by the ignition engine starting unit 168, the fuel injection and ignition are carried out in a condition where the piston 216 is stopped; therefore, the engine 12 is quickly started, resulting in fast torque response of the engine torque Te. Also, the cranking torque Tcra from the motor MG can be reduced to be zero or substantially zero; thus, the MG torque Tm of the motor MG can be exclusively used as the traveling torque Tr. As a result, the EV region in which the vehicle can travel in the motor traveling mode can be expanded, and the start of the engine 12 can be delayed, which leads to reduction in the fuel consumption amount and improved fuel economy. Meanwhile, the fuel is injected into the combustion chamber 202 in a condition where the piston 216 is stopped, namely, no airflow is generated in the combustion chamber 202; therefore, the fuel thus injected is likely to be deposited on the wall that forms the combustion chamber 202. If the mixture is ignited in this condition, the emission amount of the PM contained in exhaust gas is likely to increase.

The compression-stroke engine starting unit 170 starts the engine 12 (compression stroke starting), by rotating the engine 12 with the motor MG while injecting the fuel into the combustion chamber 202 of the cylinder 200 (compression stroke cylinder) in a condition where the piston 216 is stopped at a position on the compression stroke, as one of the cylinders 200 that constitute the engine 12, and igniting the mixture when the piston 216 passes the top dead center. The position of the piston 216 on the compression stroke is indicated by a broken line in FIG. 4, and corresponds to B position of the crank pin 224. With the piston 216 located at the position on the compression stroke, the intake valve 208 and the exhaust valve 210 are both closed, and air in the combustion chamber 202 is compressed.

The compression-stroke engine starting unit 170 rotates the crankshaft 228 with the cranking torque Tcra of the motor MG, while injecting the fuel into the combustion chamber 202 in the cylinder 200 in which the piston 216 is stopped at the position on the compression stroke, as one of the cylinders 200, and igniting the mixture at the time when the piston 216 passes the top dead center (TDC) and enters the expansion stroke, so that explosion occurs in the combustion chamber 202, and the piston 216 is pushed down, for starting of the engine 12. At this time, the clutch controller 150c cooperates with the compression-stroke engine starting unit 170 to control the clutch torque Tk0 of the K0 clutch 20, so that the engine 12 is rotated with the cranking torque Tcra of the motor MG.

In the compression stroke starting as the engine starting method executed by the compression-stroke engine starting unit 170, the piston 216 is moved from the position on the compression stroke to a position on the expansion stroke, with the cranking torque Tcra of the motor MG; therefore, the cranking torque Tcra is larger than that of the ignition starting. Accordingly, in the compression stroke starting, the traveling torque Tr is reduced, and the EV region is narrowed, as compared with the ignition starting. Namely, in the compression stroke starting, the engine 12 needs to be operated earlier as compared with the ignition starting, which results in increase of the fuel consumption amount and deterioration of the fuel economy. Also, the torque response of the engine torque Te is slower than that of the ignition starting, by an amount corresponding to cranking of the engine 12. However, in the compression stroke starting, too, the fuel injection and the ignition are carried out from a condition where the piston 216 is slightly moved, and there are no significant differences from the ignition starting. As compared with the high-rotational-speed starting, the torque response of the engine torque Te is faster, and the EV region can be broadened, which leads to reduction in the fuel consumption amount (improved fuel economy).

Also, in the compression stroke starting, the piston 216 moves due to cranking by the motor MG, and airflow is more likely to be generated in the combustion chamber 202 as compared with the ignition starting; therefore, the fuel is less likely to be deposited on the wall of the combustion chamber 202, as compared with the ignition starting. Accordingly, the emission amount of the PM contained in the exhaust gas during engine starting is reduced, as compared with the ignition starting. However, the airflow generated in the combustion chamber 202 is much smaller than that of the high-rotational-speed starting, and therefore, the emission amount of the PM contained in the exhaust gas is increased, as compared with that of the high-rotational-speed starting.

The intake-stroke engine starting unit 172 starts the engine 12 (intake stroke starting), by rotating the engine 12 by means of the motor MG while injecting the fuel into the combustion chamber 202 of the cylinder 200 (intake stroke cylinder) in which the piston 216 is stopped at a position on the intake stroke, as one of the cylinders 200 that constitute the engine 12, and igniting the mixture when the piston 216 passes the top dead center. The position on the intake stroke of the piston 216 is indicated by a one-dot chain line in FIG. 4, and corresponds to C position of the crank pin 224. When the piston 216 is on the intake stroke, the intake valve 208 is in an open state while the exhaust valve 210 is in a closed state. From this condition, when the piston 216 passes the bottom dead center (BDC) and enters the compression stroke, the intake valve 208 is closed.

The intake-stroke engine starting unit 172 starts the engine 12, by rotating the crankshaft 228 with the cranking torque Tcra of the motor MG, while injecting the fuel into the piston 216 that is stopped on the intake stroke, and igniting the mixture at the time when the piston 216 passes the top dead center (TDC) and enters the expansion stroke, so that explosion occurs in the combustion chamber 202, and the piston 216 is pushed down. At this time, the clutch controller 150c cooperates with the intake-stroke engine starting unit 172 to control the clutch torque Tk0 of the K0 clutch 20, so that the engine 12 is rotated with the cranking torque Tcra of the motor MG.

In the intake stroke starting as an engine starting method executed by the intake-stroke engine starting unit 172, the piston 216 moves from the position on the intake stroke to the position on the expansion stroke, with the cranking torque Tcra of the motor MG; therefore, the cranking torque Tcra is larger than that of the compression stroke starting. Accordingly, in the intake stroke starting, the traveling torque Tr is reduced, and the EV region is narrowed, as compared with the compression stroke starting. Namely, in the intake stroke starting, the engine 12 needs to be operated earlier as compared with the compression stroke, resulting in increase of the fuel consumption amount and deterioration of the fuel economy. Also, the torque response of the engine torque Te is made slower as compared with that of the compression stroke starting, by an amount corresponding to additional cranking of the engine 12. However, in the intake stroke starting, too, the fuel injection and the ignition are carried out from a condition where the piston 216 is slightly moved, and there are no significant differences from the ignition starting and the compression stroke starting. As compared with the high-rotational-speed starting, the response of the engine torque Te is faster, and the EV region can be broadened, which leads to reduction in the fuel consumption amount (improved fuel economy).

In the intake stroke starting, the amount of rotation of the engine 12 caused by cranking by the motor MG is larger than that of the compression stroke starting; therefore, airflow generated in the combustion chamber 202 is relatively large as compared with that of the compression stroke starting. As a result, in the intake stroke starting, the fuel is less likely to be deposited on the wall of the combustion chamber 202, and the emission amount of the PM contained in the exhaust gas is reduced as compared with the compression stroke starting. However, the airflow generated in the combustion chamber 202 is much smaller than that of the high-rotational-speed starting, and therefore, the amount of PM contained in the exhaust gas is increased, as compared with that of the high-rotational-speed starting.

FIG. 5 shows, for comparison, characteristics of four engine starting methods, i.e., the above-described ignition starting, compression stroke starting, intake stroke starting, and high-rotational-speed starting, of the engine 12. In FIG. 5, characteristics of the ignition starting are indicated in the top row, and then, characteristics of the respective engine starting methods, i.e., compression stroke starting, intake stroke starting, and high-rotational-speed starting, are indicated in this order. As described above, in the ignition starting, the torque response of the engine torque Te is fastest, and the cranking torque Tcra is smallest, among the above engine starting methods. Also, the EV region in which the vehicle can travel in the motor traveling mode is maximized; as a result, the fuel consumption amount is minimized among the above engine starting methods, and the fuel economy is optimized. On the other hand, the emission amount of the PM contained in the exhaust gas during engine starting is maximized.

In the compression stroke starting, the torque response of the engine torque Te is delayed, and the cranking torque Tcra is increased, as compared with the ignition starting, but the differences are very small. Thus, generally, the compression stroke starting is an engine starting method with fast torque response, and small cranking torque Tcra. Also, in the compression stroke starting, the EV region is narrowed, and the fuel economy deteriorates, as compared with the ignition starting, but the differences are very small. Thus, generally, the compression stroke starting is an engine starting method with good fuel economy, in which the EV region can be broadened, and thus the fuel consumption amount can be reduced. Further, in the compression stroke starting, the emission amount of the PM is reduced, as compared with the ignition starting, but the difference is very small. Thus, generally, the compression stroke starting is an engine starting method with a large amount of emission of PM.

In the intake stroke starting, the torque response of the engine torque Te is delayed, and the cranking torque Tcra is increased, as compared with the ignition starting and the compression stroke starting. However, generally, the intake stroke starting is an engine starting method with fast torque response, and small cranking torque Tcra. Also, in the intake stroke starting, the EV region is narrowed, and the fuel economy deteriorates, as compared with the ignition starting and the compression stroke starting. However, generally, the intake stroke starting is an engine starting method with good fuel economy, in which the EV region can be broadened, and thus the fuel consumption amount can be reduced. Further, in the intake stroke starting, the emission amount of the PM is reduced, as compared with the ignition starting and the compression stroke starting. However, generally, the intake stroke starting is an engine starting method with a large amount of emission of PM.

In the high-rotational-speed starting, the torque response of the engine torque Te is delayed, and the cranking torque Tcra is increased, as compared with each of the above engine starting methods. Thus, the EV region is narrowed, as compared with each of the above engine starting methods, and the fuel economy deteriorates, as compared with each of the above engine starting methods. On the other hand, the amount of emission of the PM is reduced, as compared with each of the above engine starting methods.

Accordingly, the torque response of the engine torque Te is faster, in the order of ignition starting, compression stroke starting, intake stroke starting, and high-rotational-speed starting. The cranking torque Tcra is smaller, in the order of ignition starting, compression stroke starting, intake stroke starting, and high-rotational-speed starting. The EV region is broader, in the order of ignition starting, compression stroke starting, intake stroke starting, and high-rotational-speed starting. The fuel economy is better, namely, the fuel consumption amount is smaller, in the order of ignition starting, compression stroke starting, intake stroke starting, and high-rotational-speed starting. On the other hand, the emission amount of the PM during engine starting is smaller, in the order of high-rotational-speed starting, intake stroke starting, compression stroke starting, and ignition starting.

The start controller 164 selects the engine starting method when it determines that the engine 12 is to be started during traveling in the automatic driving mode or in the vehicle following mode, and starts the engine 12 in the selected engine starting method when it determines that the engine 12 is to be started.

To select the engine starting method when it is determined that the engine 12 is to be started during traveling in the automatic driving mode or in the vehicle following mode, the start controller 164 initially determines whether a condition under which the emission amount of the PM is likely to increase is satisfied. The emission amount of the PM is likely to increase when the temperature of the wall that forms the combustion chamber 202 of the engine 12 is low. Thus, the start controller 164 determines whether the temperature of the wall of the combustion chamber 202 is low, based on the engine coolant temperature THw, or engine stop time tpass measured from a point in time at which the engine 12 was stopped last time, as a value related to the wall temperature of the combustion chamber 202. The start controller 164 determines whether the condition under which the emission amount of the PM is likely to increase is satisfied, based on whether a condition that the engine coolant temperature THw is lower than a predetermined temperature THcri set in advance, or a condition that the engine stop time tpass is equal to or longer than a predetermined time tcri, is satisfied. The start controller 164 corresponds to the controller of the disclosure which determines whether a condition under which the emission amount of particulate matter is likely to increase is satisfied.

The start controller 164 determines that the condition under which the emission amount of the PM is likely to increase is satisfied, when the engine coolant temperature THw is lower than the predetermined temperature THcri, or when the engine stop time tpass is equal to or longer than the predetermined time tcri. Also, the start controller 164 determines that the condition under which the emission amount of the PM is likely to increase is not satisfied, in other words, a condition under which the emission amount of the PM is less likely or unlikely to increase is satisfied, when the engine coolant temperature THw is equal to or higher than the predetermined temperature THcri, or when the engine stop time tpass is shorter than the predetermined time tcri. The predetermined temperature THcri of the engine coolant temperature THw, and the predetermined time tcri of the engine stop time tpass, are empirically or computationally obtained in advance, and are respectively set to threshold values of the engine coolant temperature THw and the engine stop time tpass, at which the emission amount of the PM is likely to increase because the wall temperature of the combustion chamber 202 of the engine 12 is low.

When the engine coolant temperature THw is equal to or higher than the predetermined temperature THcri, or when the engine stop time tpass is shorter than the predetermined time tcri, the start controller 164 determines that the condition under which the emission amount of the PM is less likely or unlikely to increase is satisfied. Then, the start controller 164 selects one of the ignition starting, compression stroke starting, and intake stroke starting, as the engine starting method when it is determined that the engine 12 is to be started, and causes the corresponding one of the ignition engine starting unit 168, compression-stroke engine starting unit 170, and intake-stroke engine starting unit 172 to start the engine 12. Thus, when the condition under which the emission amount of the PM is less likely or unlikely to increase is satisfied, the engine 12 is started by one of the ignition starting, compression stroke starting, and intake stroke starting, which prioritize the torque response of the engine torque Te, so that sufficient torque response of the engine torque Te can be ensured, and the EV region can be enlarged. As a result, the fuel consumption amount can be reduced, and the fuel economy can be improved.

When the engine coolant temperature THw is lower than the predetermined temperature THcri, or the engine stop time tpass is equal to or longer than the predetermined time tcri, the start controller 164 determines that the condition under which the emission amount of the PM is likely to increase during traveling in the automatic driving mode is satisfied, and determines whether the required traveling torque Trdem calculated as needed by the automatic driving controller 160 is smaller than a predetermined value α set in advance. The automatic driving controller 160 calculates the required traveling torque Trdem as future traveling torque Tr as needed, while the vehicle is traveling in the automatic driving mode. The automatic driving controller 160 calculates the required traveling torque Trdem as needed, based on road information (such as the gradient of the road surface, and the type of the road) around the current position received from the navigation system 130, and information, such as the distance between the leading vehicle and the vehicle 10, the vehicle speed of the leading vehicle, etc. received from the vehicle surrounding information sensor 124. For example, while the vehicle is traveling on a downhill, the required traveling torque Trdem calculated as needed by the automatic driving controller 160 is reduced.

The start controller 164 determines, referring to the required traveling torque Trdem calculated by the automatic driving controller 160, whether the required traveling torque Trdem is smaller than the predetermined value $\alpha$. Here, the predetermined value $\alpha$ is empirically or computationally obtained in advance, and is set to a threshold value at which it is desired to quickly increase the traveling torque Tr, and the engine 12 needs to be quickly started. In other words, the range in which the required traveling torque Trdem is smaller than the predetermined value $\alpha$ is a region in which the necessity to quickly increase the traveling torque Tr is lower, namely, the increase of the traveling torque Tr is allowed to be delayed, and starting of the engine 12 is also allowed to be delayed, as compared with the case where the required traveling torque Trdem is equal to or larger than the predetermined value $\alpha$. For example, the vehicle is in this region when it is traveling on a downhill in the automatic traveling mode, or when the vehicle is traveling while following a leading vehicle traveling at a relatively low speed, while keeping a given distance from the leading vehicle.

When the required traveling torque Trdem is smaller than the predetermined value $\alpha$, the start controller 164 determines that the vehicle is in a traveling state having a low necessity to quickly increase the traveling torque Tr, and selects the high-rotational-speed starting as the method of starting the engine 12 when it is determined that the engine 12 is to be started. Accordingly, when it is determined that the engine 12 is to be started during traveling in the automatic traveling mode, the high-rotational-speed engine starting unit 166 starts the engine 12. When the engine 12 is started by high-rotational-speed starting, a delay is likely to arise in starting of the engine 12, since the torque response of the engine torque Te is slower than those of the other engine starting methods. Meanwhile, since the required traveling torque Trdem is smaller than the predetermined value $\alpha$, there is a low possibility that a problem occurs in traveling of the vehicle 10, even when a delay arises in starting of the engine 12, and a delay arises in increase of the traveling torque Tr. With the engine 12 thus started by high-rotational-speed starting, the emission amount of the PM contained in exhaust gas is less likely or unlikely to increase.

On the other hand, when the required traveling torque Trdem is equal to or larger than the predetermined value $\alpha$, the start controller 164 determines that the vehicle is in a traveling state that requires quick increase of the traveling torque Tr, and selects one of the ignition starting, compression stroke starting, and intake stroke starting, as the method of starting the engine 12 when it is determined that the engine 12 is to be started. Accordingly, when it is determined that the engine 12 is to be started during traveling in the automatic driving mode, one of the ignition engine starting unit 168, compression-stroke engine starting unit 170, and intake-stroke engine starting unit 172 starts the engine 12. When the required traveling torque Trdem is considerably higher than the predetermined value $\alpha$, for example, the start controller 164 selects ignition starting as the method of starting the engine 12, and causes the ignition engine starting unit 168 to start the engine 12 when it is determined that the engine 12 is to be started. When the required traveling torque Trdem is equal to or higher than the predetermined value $\alpha$, but a difference between the required traveling torque Trdem and the predetermined value $\alpha$ is within a predetermined range, the start controller 164 selects the compression stroke starting or intake stroke starting, as the method of starting the engine 12, and causes the compression-stroke engine starting unit 170 or the intake-stroke engine starting unit 172 to start the engine 12, when it is determined that the engine 12 is to be started during traveling in the automatic traveling mode.

When the required traveling torque Trdem is equal to or larger than the predetermined value $\alpha$, the traveling torque Tr needs to be quickly increased, and therefore, the engine 12 needs to be quickly started. In this case, the engine 12 is quickly started by one of the ignition starting, compression stroke starting, and intake stroke starting, so that the torque response of the engine torque Te is improved, and the required traveling torque Trdem can be quickly achieved. Also, with the torque response thus improved, the EV region can be expanded during traveling in the automatic traveling mode, and, consequently, the fuel consumption amount can be reduced, namely, the fuel economy can be improved.

When the start controller 164 determines, based on the engine coolant temperature THw or the engine stop time tpass while the vehicle is traveling while following a leading vehicle, that the condition under which the PM is likely to increase is satisfied, the start controller 164 determines whether the required traveling torque Trdem calculated as needed by the following travel controller 162 is smaller than the predetermined value $\alpha$. During following traveling, the following travel controller 162 calculates the required traveling torque Trdem as future traveling torque Tr as needed. The following travel controller 162 calculates the required traveling torque Trdem as needed, based on information, such as the distance between the leading vehicle and the vehicle 10, the vehicle speed of the leading vehicle, and the gradient of the road surface. For example, when the vehicle is traveling on a downhill, or the like, the required traveling torque Trdem calculated as needed by the following travel controller 162 is small.

When the required traveling torque Trdem is smaller than the predetermined value $\alpha$, the start controller 164 determines that the vehicle is in a traveling state having a low necessity to quickly increase the traveling torque Tr, and selects the high-rotational-speed starting as the method of starting the engine 12 when it is determined that the engine 12 is to be started. Accordingly, when it is determined during following traveling that the engine 12 is to be started, the high-rotational-speed engine starting unit 166 starts the engine 12. When the engine 12 is started by high-rotational-speed starting, the torque response of the engine torque Te is slower than those of the other engine starting methods, and therefore, a delay is likely to arise in starting of the engine 12. Meanwhile, since the required traveling torque Trdem is lower than the predetermined value $\alpha$, there is a low possibility that a problem arises in traveling of the vehicle 10, even when starting of the engine 12 is delayed, and the traveling torque Tr is increased with a delay. Also, since the engine 12 is started by high-rotational-speed starting, increase of the emission amount of the PM included in exhaust gas is curbed.

On the other hand, when the required traveling torque Trdem is equal to or larger than the predetermined value $\alpha$, the start controller 164 determines that the vehicle is in a traveling state in which the traveling torque Tr needs to be quickly increased, and selects one of the ignition starting, compression stroke starting, and intake stroke starting, as the method of starting the engine 12 when it is determined that the engine 12 is to be started. Namely, when it is determined during following traveling that the engine 12 is to be started, one of the ignition engine starting unit 168, compression-stroke engine starting unit 170, and intake-stroke engine starting unit 172 starts the engine 12. Which of the ignition engine starting unit 168, compression-stroke engine starting unit 170, and intake-stroke engine starting unit 172 starts the engine 12 is selected as appropriate, based on the required traveling torque Trdem, etc. When the required traveling torque Trdem becomes equal to or larger than the predetermined value α, the engine 12 needs to be quickly started. In this case, the engine 12 is quickly started by one of the ignition starting, compression stroke starting, and intake stroke starting, so that the torque response of the engine torque Te is improved, and the required traveling torque Trdem can be quickly achieved. Also, with the torque response thus improved, the EV region during following traveling can be expanded, and, consequently, the fuel consumption amount can be reduced, namely, the fuel economy can be improved.

Figure 6:
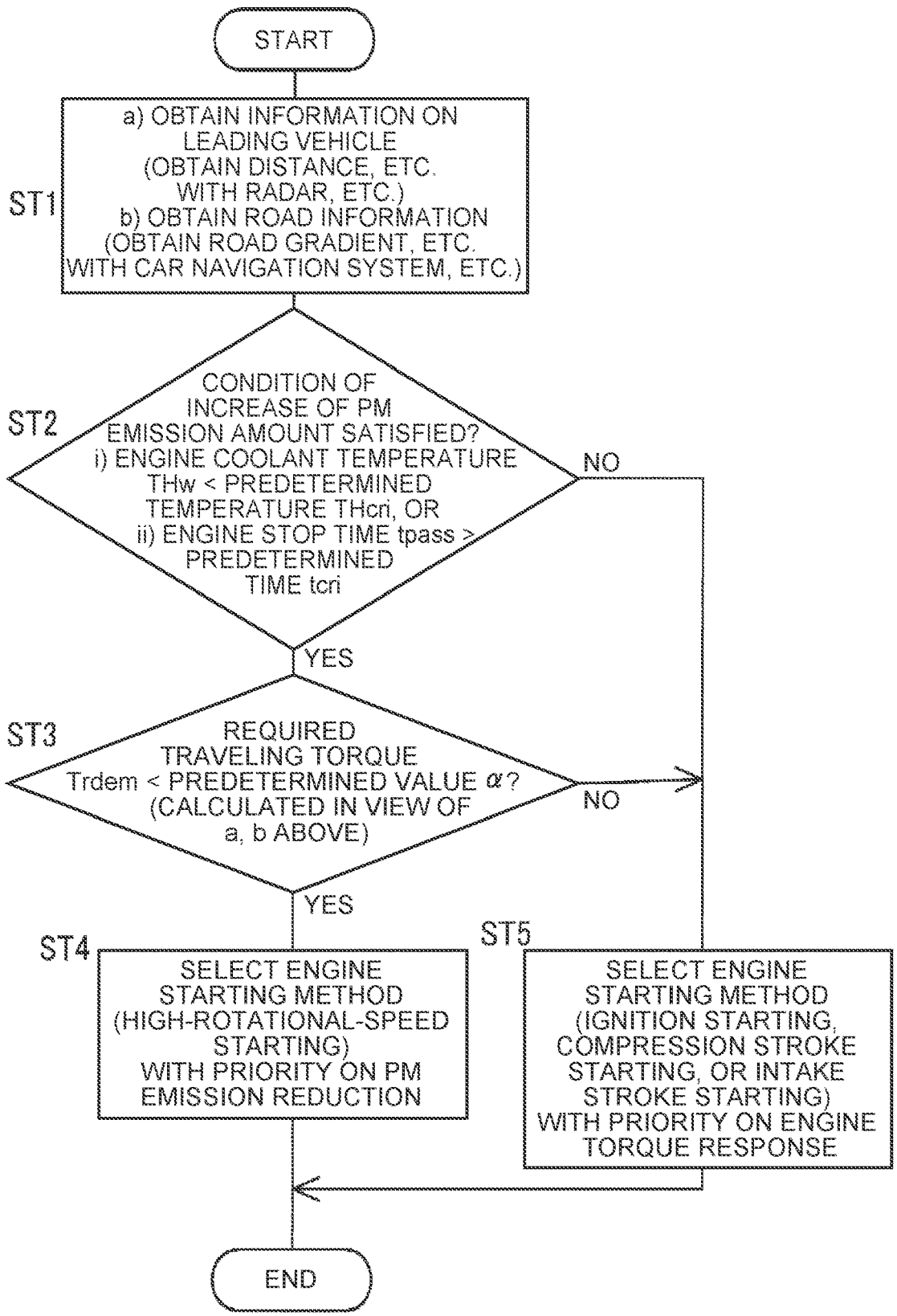
FIG. 6 is a flowchart illustrating a principal part of control operation of the electronic control unit of FIG. 2, namely, control operation to curb increase of the emission amount of PM, while assuring sufficient torque response of the engine upon engine start, by appropriately selecting an engine starting method when it is determined that the engine is to be started, during traveling in an automatic driving mode or vehicle following mode, and during traveling in a motor traveling mode.

FIG. 6 is a flowchart illustrating a principal part of control operation of the electronic control unit 90, namely, control operation to curb increase of the PM emission amount, while ensuring sufficient torque response of the engine 12, by appropriately selecting the method of starting the engine 12 when it is determined that the engine 12 is to be started, during traveling in the automatic driving mode or in the vehicle following mode, and during traveling in the motor traveling mode. A control routine in the flowchart is repeatedly executed during traveling in the automatic driving mode or in the vehicle following mode.

Initially, in step ST1 corresponding to a control function of the automatic driving controller 160 or the following travel controller 162, the vehicle surrounding information sensor 124 obtains vehicle surrounding information, such as a distance from a leading vehicle traveling ahead, and the vehicle speed of the leading vehicle, and the navigation system 130 obtains road information, such as the gradient of the road concerned, and the type of the road. Then, in step ST2 corresponding to a control function of the start controller 164, it is determined whether a condition under which the PM emission amount is likely to increase is satisfied. More specifically, it is determined whether the engine coolant temperature THw is lower than the predetermined temperature THcri, or whether the engine stop time tpass of the engine 12 is equal to or longer than the predetermined time tcri.

When the engine coolant temperature THw is lower than the predetermined temperature THcri, or when the engine stop time tpass is longer than the predetermined time tcri, an affirmative decision (YES) is obtained in step ST2, and the control proceeds to step ST3. In step ST3 corresponding to a control function of the start controller 164, the required traveling torque Trdem corresponding to future traveling torque Tr is calculated, based on various kinds of information obtained in step ST1, and it is determined whether the required traveling torque Trdem thus calculated is smaller than the predetermined value α. When the required traveling torque Trdem is smaller than the predetermined value α, an affirmative decision (YES) is obtained in step ST3, and the control proceeds to step ST4.

In step ST4 corresponding to control functions of the start controller 164 and the high-rotational-speed engine starting unit 166, it is determined that the necessity to quickly increase the traveling torque Tr is low, and priority is placed on curbing increase of the PM emission amount; thus, the high-rotational-speed starting is selected as the engine starting method. Namely, when it is determined that the engine 12 is to be started during traveling in the automatic traveling mode, the engine 12 is started by high-rotational-speed starting. With the engine 12 thus started by high-rotational-speed starting, airflow is generated in the cylinder 200 when the engine speed Ne is raised to the predetermined speed during engine starting, and the fuel deposited on the wall of the combustion chamber 202 is reduced. Accordingly, the emission amount of the PM contained in the exhaust gas is less likely or unlikely to increase.

Returning to step ST3, when the required traveling torque Trdem is equal to or larger than the predetermined value α, it is determined that the traveling torque Tr needs to be quickly increased, and a negative decision (NO) is obtained in step ST3. Then, the control proceeds to step ST5. In step ST5 corresponding to control functions of the start controller 164, ignition engine starting unit 168, compression-stroke engine starting unit 170, and intake-stroke engine starting unit 172, one of the ignition starting, compression stroke starting, and intake stroke starting, which prioritize the torque response of the engine torque Te, is selected, as the method of starting the engine 12. As a result, the engine 12 is started early upon engine start, and sufficient torque response of the engine torque Te is ensured.

Returning to step ST2, when the engine coolant temperature THw is equal to or higher than the predetermined temperature THcri, or when the engine stop time tpass is shorter than the predetermined time tcri, a negative decision (NO) is obtained in step ST2, and the control proceeds to step ST5, in which engine starting that prioritizes the torque response of the engine torque Te is carried out. As a result, the engine 12 is started early upon engine start, and sufficient torque response of the engine torque Te is ensured.

As described above, when the condition under which the PM emission amount is likely to increase is satisfied, and the required traveling torque Trdem is smaller than the predetermined value α, the high-rotational-speed starting, with which increase of the emission amount of the PM contained in the exhaust gas is curbed, is selected, and the engine 12 is started by high-rotational-speed starting. When the condition under which the PM emission amount is less likely or unlikely to increase is satisfied, and when the required traveling torque Trdem is equal to or larger than the predetermined value α, engine starting (one of the ignition starting, compression stroke starting, and intake stroke starting) that prioritizes the torque response of the engine torque Te is selected, so that the torque response upon engine start is improved, and rapid acceleration can be promptly achieved.

While the vehicle is traveling in the automatic traveling mode, the required traveling torque Trdem calculated as needed by the automatic driving controller 160 is changed according to traveling conditions set during automatic driving. For example, as the upper limit of the vehicle speed V during traveling in the automatic driving mode is lower, the required traveling torque Trdem is reduced. Thus, the start controller 164 determines, during traveling in the automatic driving mode, whether the condition under which the emission amount of the PM emitted during engine starting is likely to increase is satisfied. If the condition under which the emission amount of the PM emitted during engine starting is likely to increase is satisfied, the start controller 164 outputs a command to change a traveling condition set during automatic driving, to the automatic driving controller 160, so that the required traveling torque Trdem calculated as needed is reduced. For example, the start controller 164 changes the upper limit of the vehicle speed V during automatic driving, to the lower speed, as a traveling condition during traveling in the automatic driving mode. As a result, the required traveling torque Trdem calculated as needed by the automatic driving controller 160 is reduced.

As the required traveling torque Trdem calculated as needed by the automatic driving controller 160 is reduced, the required traveling torque Trdem calculated as needed is more likely to be lower than the predetermined value α. As a result, the high-rotational-speed starting that curbs increase of the PM emission amount is more likely to be selected, and the engine 12 is started by high-rotational-speed starting, so that increase of the emission amount of the PM emitted during engine starting can be curbed.

Figure 7:
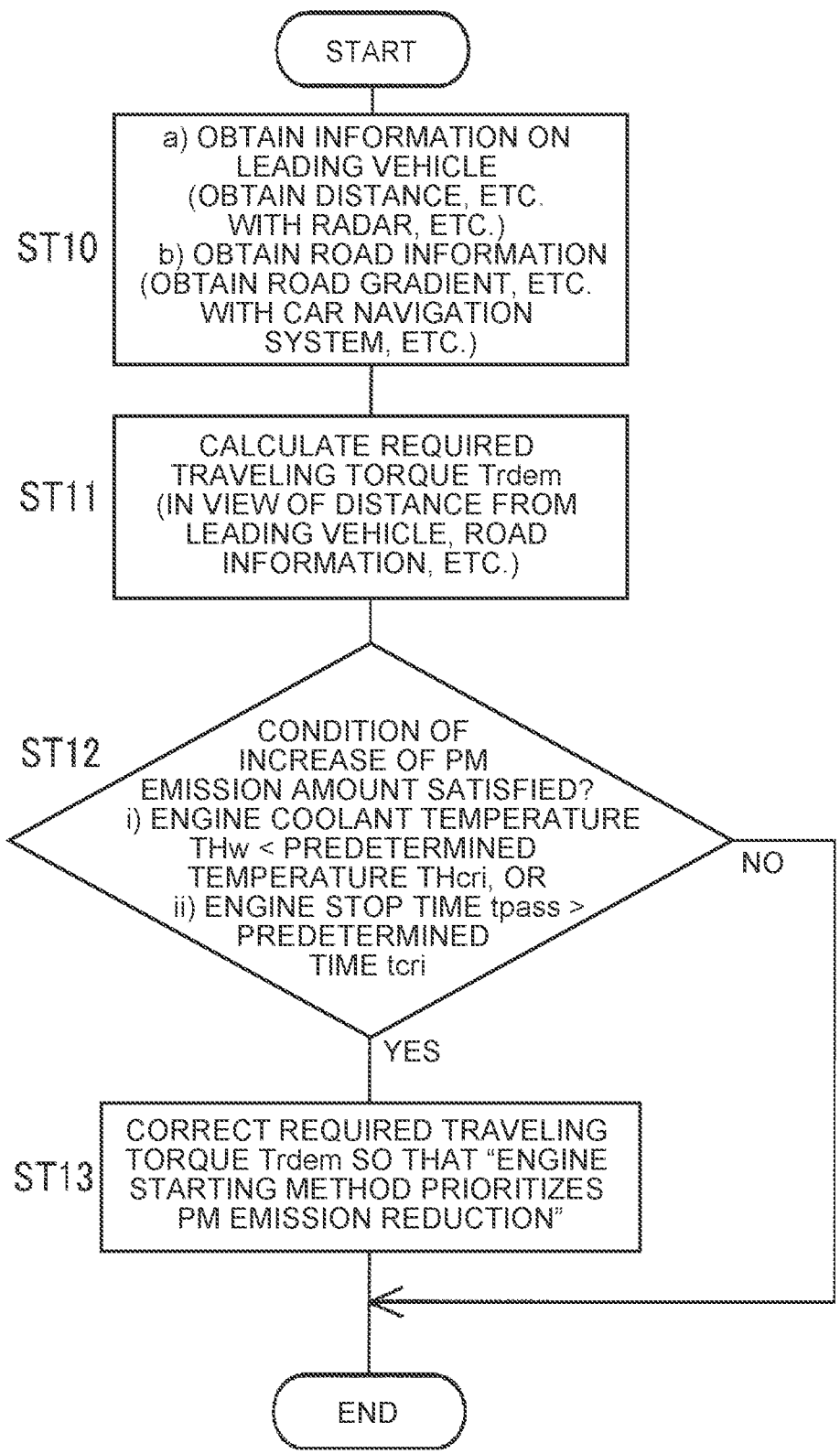
FIG. 7 is a flowchart illustrating a principal part of control operation of the electronic control unit of FIG. 2, namely, control operation to correct, as needed, required traveling torque calculated during traveling in the automatic driving mode, so that high-rotational-speed starting is preferentially executed, upon engine start when the PM emission amount is likely to increase.

FIG. 7 is a flowchart illustrating a principal part of control functions of the electronic control unit 90, namely, control operation to preferentially execute high-rotational-speed starting that curbs increase of the PM emission amount, at the time of engine start when the condition under which the PM emission amount is likely to increase is satisfied, by suitably correcting the required traveling torque Trdem calculated during traveling in the automatic driving mode. A control routine in the flowchart of FIG. 7 is repeatedly executed during traveling in the automatic driving mode, and traveling in the motor traveling mode.

Initially, in step ST10 corresponding to a control function of the automatic driving controller 160, the vehicle surrounding information sensor 124 obtains vehicle surrounding information, such as a distance from a leading vehicle traveling ahead, and the vehicle speed of the leading vehicle, and the navigation system 130 obtains road information, such as the gradient of the road concerned, and the type of the road. Then, in step ST11 corresponding to a control function of the automatic driving controller 160, the required traveling torque Trdem is calculated, based on the vehicle surrounding information and road information obtained in step ST10.

In step ST12 corresponding to a control function of the start controller 164, it is determined whether a condition under which the PM emission amount is likely to increase is satisfied. More specifically, it is determined whether the PM emission amount is likely to increase, based on whether the engine coolant temperature THw is lower than the predetermined temperature THcri, or whether the engine stop time tpass of the engine 12 is equal to or longer than the predetermined time tcri. When the engine coolant temperature THw is equal to or higher than the predetermined temperature THcri, or the engine stop time tpass is shorter than the predetermined time tcri, a negative decision (NO) is obtained in step ST12, and the control returns.

When the engine coolant temperature THw is lower than the predetermined temperature THcri, or the engine stop time tpass of the engine 12 is equal to or longer than the predetermined time tcri, an affirmative decision (YES) is obtained in step ST12, and the control proceeds to step ST13. In step ST13 corresponding to control functions of the start controller 164 and the automatic driving controller 160, a traveling condition set during automatic driving is changed, so that high-rotational-speed starting is preferentially carried out upon engine start, namely, the required traveling torque Trdem is reduced. Also, the required traveling torque Trdem is re-calculated based on the traveling condition thus changed, and the required traveling torque Trdem is corrected to a value as a result of the re-calculation. Thus, the required traveling torque Trdem is corrected to be reduced, so that the high-rotational-speed starting is more likely to be selected during traveling in the automatic driving mode, and increase of the PM emission amount is favorably curbed.

As described above, according to this embodiment, when the vehicle is in a traveling state having a low necessity to quickly increase the traveling torque Tr of the vehicle 10, the high-rotational-speed engine starting unit 166 that curbs increase of the emission amount of the PM emitted during engine starting starts the engine 12. In the traveling state having a low necessity to quickly increase the traveling torque Tr, quick torque response of the engine torque Te is not required; therefore, in this case, the high-rotational-speed engine starting unit 166 starts the engine 12, so as to curb increase of the emission amount of the PM emitted during engine starting.

Also, according to this embodiment, when the required traveling torque Trdem during traveling in the automatic driving mode is smaller than the predetermined value α, the vehicle is considered as being in the traveling state having a low necessity to quickly increase the traveling torque Tr; thus, the high-rotational-speed engine starting unit 166 starts the engine 12 at this time, so as to curb increase of the emission amount of the PM emitted during engine starting. Also, when the required traveling torque Trdem during following traveling is smaller than the predetermined value α, the vehicle is considered as being in the traveling state having a low necessity to quickly increase the traveling torque Tr; thus, the high-rotational-speed engine starting unit 166 starts the engine 12 at this time, so as to curb increase of the emission amount of the PM emitted during engine starting. Also, it is determined whether the temperature of the wall of the combustion chamber 202 of the engine 12 is low, and any condition under which the PM emission amount is likely to increase is satisfied, based on whether the engine coolant temperature THw of the engine 12 is lower than the predetermined temperature THcri, or whether the engine stop time tpass of the engine 12 is equal to or longer than the predetermined time tcri. Thus, when the above condition is satisfied, the high-rotational-speed engine starting unit 166 starts the engine 12, so that increase of the emission amount of the PM can be efficiently curbed. Also, since the high-rotational-speed engine starting unit 166 starts injection and ignition of the fuel when the engine speed Ne reaches the predetermined rotational speed Ne1 set in advance, airflow is generated in the combustion chamber 202 of the engine 12, so that the fuel is less likely to be deposited on the wall of the combustion chamber 202, and the fuel can be appropriately burned. As a result, the emission amount of the PM contained in the exhaust gas is reduced. When the vehicle is in a traveling state in which the traveling torque Tr needs to be quickly increased, one of the ignition engine starting unit 168, compression-stroke engine starting unit 170, and intake-stroke engine starting unit 172 starts the engine 12, so that the torque response of the engine torque Te is improved, and the drivability is improved.

Next, another embodiment of the disclosure will be described. In the following description, the same reference signs are assigned to components or portions common to the above embodiment, and the components or portions will not be described.

Second Embodiment

In the first embodiment, the required traveling torque Trdem during traveling in the automatic driving mode or in the vehicle following mode is calculated as needed, and the engine starting method executed upon engine start is selected, based on whether the required traveling torque Trdem thus calculated is smaller than the predetermined value α. In this embodiment, during traveling in the automatic traveling mode or in the vehicle following mode, it is determined that the vehicle is in a traveling state having a low necessity to quickly increase the traveling torque Tr, as compared with the case where the vehicle is traveling in the manual driving mode, and the high-rotational-speed starting is selected as the engine starting method. Thus, when it is determined that the engine 12 is to be started, the engine 12 is started by high-rotational-speed starting.

Figure 8:
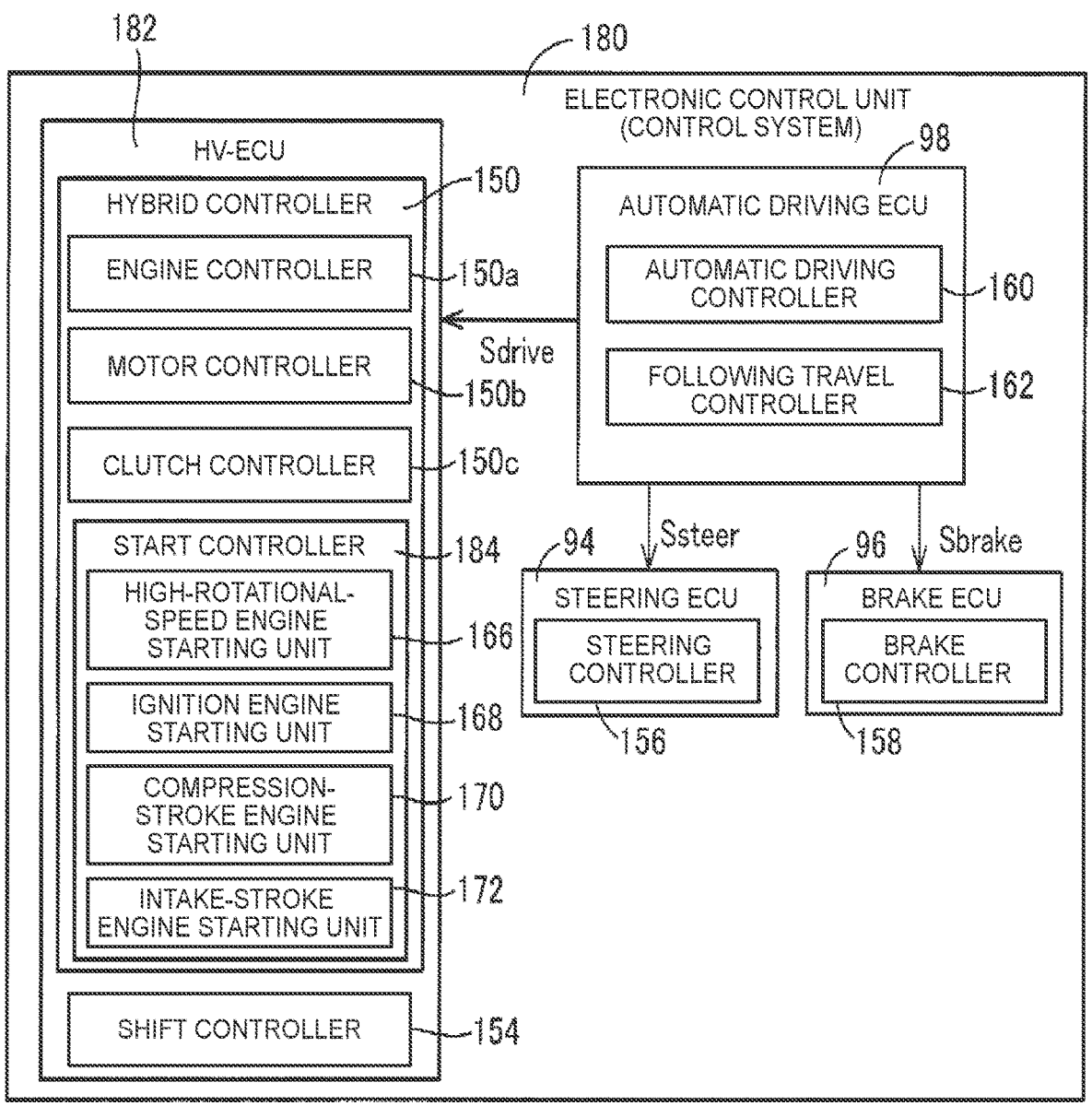
FIG. 8 is a functional block diagram corresponding to another embodiment of the disclosure, which diagram is useful for describing a principal part of control functions of each ECU that constitutes the electronic control unit.

FIG. 8 is a functional block diagram useful for describing a principal part of each ECU that constitutes an electronic control unit 180 of this embodiment. The electronic control unit 180 includes an HV-ECU 182, steering ECU 94, brake ECU 96, and automatic driving ECU 98. Control functions of the steering controller 156 functionally included in the steering ECU 94, brake controller 158 functionally included in the brake ECU 96, and automatic driving controller 160 and following travel controller 162 functionally included in the automatic driving ECU 98 are similar to those of the above embodiment, and therefore, will not be described.

The HV-ECU 182 functionally includes the engine controller 150a, motor controller 150b, clutch controller 150c, shift controller 154, and start controller 184. The control functions of the engine controller 150a, motor controller 150b, clutch controller 150c, and shift controller 154 are similar to those of the above embodiment, and therefore, will not be described.

The start controller 184 includes the high-rotational-speed engine starting unit 166, ignition engine starting unit 168, compression-stroke engine starting unit 170, and intake-stroke engine starting unit 172. The control functions of the high-rotational-speed engine starting unit 166, ignition engine starting unit 168, compression-stroke engine starting unit 170, and intake-stroke engine starting unit 172 are similar to those of the above embodiment, and therefore, will not be described.

The start controller 184 determines whether a condition under which the PM emission amount is likely to increase is satisfied, during traveling in the automatic driving mode or in the vehicle following mode. The method of determining whether the condition under which the PM emission amount is likely to increase is satisfied is the same as that of the above embodiment, and thus will not be described. When it is determined that the condition under which the PM emission amount is likely to increase is satisfied during traveling in the automatic driving mode, and the vehicle is traveling in the automatic driving mode, the start controller 184 determines that the vehicle is in a traveling state having a low necessity to quickly increase the traveling torque Tr, and selects high-rotational-speed starting as the method of starting the engine 12. Namely, when it is determined that the engine 12 is to be started during traveling in the automatic driving mode, the high-rotational-speed engine starting unit 166 starts the engine 12. Also, when it is determined that the condition under which the PM emission amount is likely to increase is satisfied during following traveling, and the vehicle is traveling in the vehicle following mode, the start controller 184 determines that the vehicle is in a traveling state having a low necessity to quickly increase the traveling torque Tr, and selects high-rotational-speed starting as the method of starting the engine 12. Namely, when it is determined that the engine 12 is to be started during following traveling, the high-rotational-speed engine starting unit 166 starts the engine 12. Thus, when the condition under which the PM emission amount is likely to increase is satisfied during traveling in the automatic driving mode and in the vehicle following mode, the high-rotational-speed starting is selected as the method of starting the engine 12. Then, when it is determined that the engine 12 is to be started, the engine 12 is started by high-rotational-speed starting.

During traveling in the automatic driving mode and in the vehicle following mode, the driver hardly feels uncomfortable or strange when a delay arises in following of the traveling torque Tr toward the required traveling torque Trdem. Thus, it is determined that the vehicle is in the traveling state having a low necessity to quickly increase the traveling torque Tr, during traveling in the automatic driving mode and in the vehicle following mode, and high-rotational-speed starting is selected as the engine starting method. As a result, the engine 12 is started by high-rotational-speed starting, so that increase of the PM emission amount is effectively curbed. Also, in a condition where a condition under which the PM emission amount is less likely or unlikely to increase is satisfied, one of the ignition starting, compression stroke starting, and intake stroke starting is selected. During traveling in a mode other than the automatic driving mode and the vehicle following mode, namely, while the vehicle is being driven by the driver, it is preferable to promptly achieve the required traveling torque Trdem based on operation of the driver; therefore, it is determined that the vehicle is in a traveling state in which the traveling torque Tr needs to be quickly increased. As a result, one of the ignition starting, compression stroke starting, and intake stroke starting is selected as the engine starting method. With the engine 12 thus started by one of the ignition starting, compression stroke starting, and intake stroke starting, the torque response of the engine 12 is improved, and the EV region can be expanded. Consequently, the fuel consumption amount is reduced, and the fuel economy can be improved.

Figure 9:
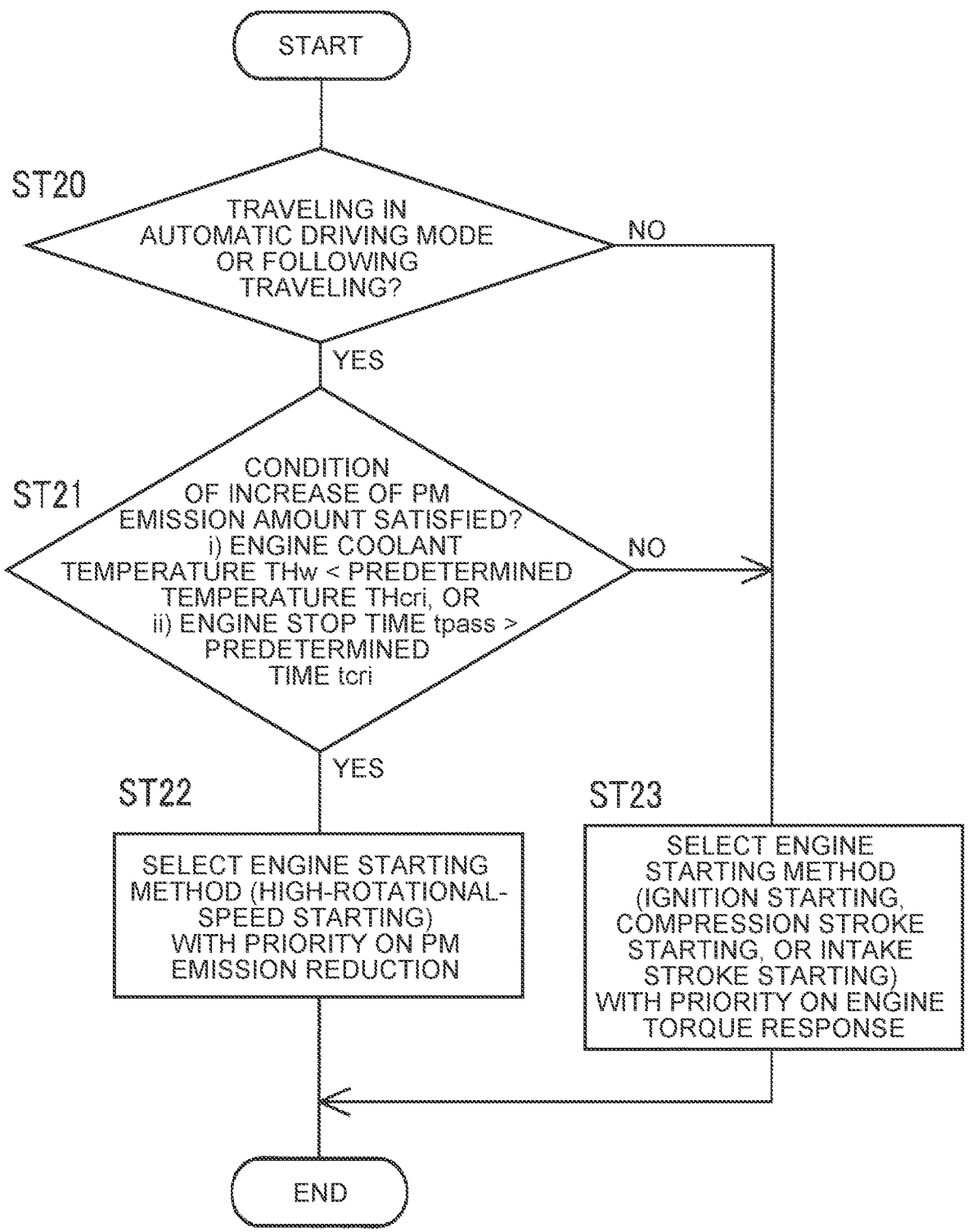
FIG. 9 is a flowchart illustrating a principal part of control operation of the electronic control unit of FIG. 8, namely, control operation to curb increase of the emission amount of PM, while assuring sufficient torque response of the engine upon engine start, by appropriately selecting an engine starting method when it is determined that the engine is to be started, during traveling in an automatic driving mode or vehicle following mode, and during traveling in a motor traveling mode.

FIG. 9 is a flowchart illustrating a principal part of control operation of the electronic control unit 180, namely, control operation to curb increase of the PM emission amount, while assuring sufficient torque response of the engine 12, by appropriately selecting the method of starting the engine 12 when it is determined that the engine 12 is to be started, during traveling in the automatic driving mode or vehicle following mode, and during traveling in the motor traveling mode. A control routine of this flowchart is repeatedly executed during traveling in the automatic driving mode or vehicle following mode.

Initially, in step ST20 corresponding to control functions of the automatic driving controller 160 and the following travel controller 162, it is determined whether the vehicle is traveling in the automatic driving mode or vehicle following mode. When an affirmative decision (YES) is obtained in step ST20, it is determined that the vehicle is in a traveling state having a low necessity to quickly increase the traveling torque Tr, and the control proceeds to step ST21. When a negative decision (NO) is obtained in step ST20, the control proceeds to step ST23.

In step ST21 corresponding to a control function of the start controller 184, it is determined whether a condition under which the PM emission amount is likely to increase is satisfied. More specifically, it is determined whether the engine coolant temperature THw is lower than the predetermined temperature THcri, or whether the engine stop time tpass of the engine 12 is equal to or longer than the predetermined time tcri. When an affirmative decision (YES) is obtained in step ST21, the control proceeds to step ST22. When a negative decision (NO) is obtained in step ST21, the control proceeds to step ST23.

In step ST22 corresponding to control functions of the start controller 184 and the high-rotational-speed engine starting unit 166, priority is placed on curbing increase of the PM emission amount, and the high-rotational-speed starting is selected as the engine starting method. Namely, when it is determined that the engine 12 is to be started during traveling in the automatic driving mode or vehicle following mode, the engine 12 is started by high-rotational-speed starting.

When a negative decision (NO) is obtained in step ST20, or when a negative decision (NO) is obtained in step ST21, the control proceeds to step ST23 corresponding to control functions of the start controller 184, ignition engine starting unit 168, compression-stroke engine starting unit 170, and intake-stroke engine starting unit 172, and one of the ignition starting, compression stroke starting, and intake stroke starting, which prioritizes the torque response of the engine torque Te, is selected as the method of starting the engine 12. Thus, the engine 12 is started early upon start of the engine 12, and sufficient torque response of the engine torque Te is ensured.

As described above, the vehicle is considered as being in a traveling state having a low necessity to quickly increase the traveling torque Tr, during traveling in the automatic driving mode and in the vehicle following mode. Thus, when the engine 12 is started during traveling in the automatic driving mode or vehicle following mode, high-rotational-speed starting is selected as the engine starting method, and the engine 12 is started by high-rotational-speed starting upon engine start, so that increase of the emission amount of the PM emitted during engine starting is curbed. Also, when the vehicle is in a traveling state other than traveling in the automatic driving mode and vehicle following mode, it is considered to be in a traveling state in which the traveling torque Tr needs to be quickly increased. Thus, one of the ignition starting, compression stroke starting, and intake stroke starting is selected, as the engine starting method, and the engine 12 is started by one of the ignition starting, compression stroke starting, and intake stroke starting, so that sufficient response of the engine torque Te can be ensured. In this connection, the EV region can be expanded, so that the fuel consumption amount can be reduced, and the fuel economy can be improved. Thus, according to this embodiment, substantially the same effects as those of the above embodiment can be obtained.

While the embodiments of the disclosure have been described in detail based on the drawings, the disclosure may be applied in other forms.

In the first embodiment, when the required traveling torque Trdem calculated during traveling in the automatic driving mode is smaller than the predetermined value α, or the required traveling torque Trdem calculated during traveling in the vehicle following mode is smaller than the predetermined value α, and a condition under which the PM emission amount is likely to increase is satisfied, the start controller 164 selects the high-rotational-speed starting as the method of starting the engine 12, and causes the high-rotational-speed engine starting unit 166 to start the engine 12 when it is determined that the engine 12 is to be started. However, the determination as to whether the condition under which the PM emission amount is likely to increase is satisfied is not essential, but may not be made. Namely, when the required traveling torque Trdem calculated during traveling in the automatic driving mode is smaller than the predetermined value α, or when the required traveling torque Trdem calculated during traveling in the vehicle following mode is smaller than the predetermined value α, the engine 12 may be started by high-rotational-speed starting.

In the second embodiment, when it is determined that the engine 12 is to be started during traveling in the automatic driving mode or in the vehicle following mode, the start controller 184 selects high-rotational-speed starting as the engine starting method, and causes the high-rotational-speed engine starting unit 166 to start the engine 12 when it is determined that the engine 12 is to be started. However, the determination as to whether a condition under which the PM emission amount is likely to increase is satisfied is not essential, but may not be made. Namely, when it is determined that the engine 12 is to be started during traveling in the automatic traveling mode or in the vehicle following mode, the engine 12 may be started by high-rotational-speed starting.

In the first embodiment, when the required traveling torque Trdem during traveling in the automatic driving mode (or in the vehicle following mode) is equal to or larger than the predetermined value α, or when a condition under which the PM emission amount is less likely or unlikely to increase is satisfied, the engine 12 is started by one of ignition starting, compression stroke starting, and intake stroke starting. However, it is not necessary to provide all of these engine starting methods. Namely, the start controller 164 may be configured to be able to start the engine 12, by at least one of the ignition starting, compression stroke starting, and intake stroke starting.

In the second embodiment, when the vehicle is traveling in a mode (i.e., the manual driving mode) other than the automatic driving mode and the vehicle following mode, or when any condition under which the PM emission amount is less likely or unlikely to increase is satisfied, the engine 12 is started by one of the ignition starting, compression stroke starting, and intake stroke starting. However, it is not necessary to provide all of these engine starting methods. Namely, the start controller 184 may be configured to be able to start the engine 12, by at least one of the ignition starting, compression stroke starting, and intake stroke starting.

In the first embodiment, the method of starting the engine 12 is selected, based on whether the required traveling torque Trdem during traveling in the automatic driving mode or vehicle following method is smaller than the predetermined value α. However, this disclosure may be applied to a vehicle capable of traveling in either one of the automatic driving mode and the vehicle following mode. Similarly, in the second embodiment, this disclosure may be applied to a vehicle capable of traveling in either one of the automatic driving mode and the vehicle following mode.

While the automatic driving ECU 98 functionally includes the automatic driving controller 160 and the following travel controller 162 in the above embodiments, the automatic driving controller 160 and the following travel controller 162 may be separately provided in different ECUs. Namely, an ECU for traveling in the automatic driving mode and an ECU for traveling in the vehicle following mode may be separately provided. With regard to the other ECUs, the ECUs are not necessarily provided separately for the respective functions as described above, but a common ECU may include the respective control functions. Thus, the number and configuration of the ECUs may be changed as needed. Namely, the ECUs in which the respective controllers as described above are stored are not limited to those of the above embodiments, but may be changed as needed.

In the above embodiments, the driving force and the braking force are controlled, during following traveling, so that the vehicle follows a leading vehicle that travels ahead. Furthermore, steering of the wheels may also be controlled so that the vehicle follows the leading vehicle.

While the vehicle 10 is configured to be able to travel in both the automatic driving mode and the vehicle following mode, it may be configured to be able to travel in either one of the automatic driving mode and the vehicle following mode. Namely, the disclosure may be applied to either one of traveling in the automatic driving mode and traveling in the vehicle following mode.

In the above embodiments, the driving force of the vehicle 10, braking force of the vehicle 10, and steering of the wheels are controlled during traveling in the automatic driving mode. However, it is not necessary to control all of these during traveling in the automatic driving mode, but at least one of these may be automatically controlled. Regarding steering of the wheels, for example, the steering wheel 64 may be operated by the driver. In sum, the disclosure may be applied, if traveling of the vehicle 10 in the automatic driving mode is controlled, such that at least a part of the operating states of the vehicle 10 does not depend on operation by the driver, during traveling in the automatic driving mode.

In the above embodiments, it is determined whether a condition under which the PM emission amount is likely to increase is satisfied, based on whether the engine coolant temperature THw is lower than the predetermined temperature THcri, or the engine stop time tpass is equal to or longer than the predetermined time tcri. However, the determination is not necessarily made based on one of the engine coolant temperature THw and the engine stop time tpass, but it may be determined whether the condition under which the PM emission amount is likely to increase is satisfied, based on both the engine coolant temperature THw and the engine stop time tpass.

In the above embodiments, the predetermined value α of the required traveling torque Trdem during traveling in the automatic driving mode and the predetermined value α of the required traveling torque Trdem during traveling in the vehicle following mode are set to the same value. However, the predetermined value α may be set to different values for use in the automatic driving mode and in the vehicle following mode, respectively.

In the above embodiments, the planetary gear type automatic transmission is illustrated by way of example, as the automatic transmission 24 that provides a part of the power transmission path between the engine 12 and the rear wheels 14r, and transmits driving force from each of the driving force sources (the engine 12, motor MG) to the rear wheels 14r. However, the disclosure is not limited to this form. The automatic transmission 24 may be a synchromesh parallel dual-axis automatic transmission including a known Dual Clutch Transmission (DCT), or a known belt-type continuously variable transmission.

In the above embodiments, the vehicle 10 is a hybrid vehicle of one motor type, which uses the engine 12 and the motor MG as the driving force sources, and in which the engine 12 and the motor MG are connected via the K0 clutch 20. However, the hybrid vehicle of this disclosure is not necessarily limited to this arrangement. For example, the vehicle may be a hybrid vehicle that includes an engine, first motor MG1, second motor MG2, and a power distribution mechanism that distributes power of the engine 12 to an output shaft and the first motor MG1, and is configured such that the second motor MG2 is connected to the output shaft such that power can be transmitted therebetween. Namely, the disclosure may be suitably applied to a hybrid vehicle, provided that it uses an engine and a motor as driving force sources, and is configured such that the engine 12 can stop and start according to the traveling state.

While the engine 12 is a V-six four-cycle direct-injection gasoline engine in the above embodiments, the type of the engine is not limited to this. Namely, the disclosure may be suitably applied if the engine is able to perform high-rotational-speed starting, and is able to perform at least one engine starting of the ignition starting, compression starting, and intake stroke starting.

In the first embodiment, the method of starting the engine 12 is selected, based on whether the required traveling torque Trdem calculated as needed based on the traveling state during automatic driving or following traveling is smaller than the predetermined value α. However, the future required traveling torque Trdem at a point in time further ahead may be predictively calculated, from road information (the gradient of the road surface, type of the road, etc.) in the vicinity of the current position, which is obtained from the navigation system 130, and the engine starting method may be selected, based on whether the required traveling torque Trdem at the future point in time is smaller than the predetermined value α.

In the above embodiments, the method of starting the engine 12 is selected, based on the required traveling torque Trdem during automatic driving or following traveling, or whether the vehicle is traveling in the automatic driving mode or in the vehicle following mode. However, the basis for selection of the engine starting method is not necessarily limited to automatic driving or following traveling. Rather, during driving by operation of the driver, for example, it may be determined whether the vehicle is in a traveling state in which the traveling torque Tr needs to be quickly increased, based on information on roads in the vicinity of the current position, which is obtained from the navigation system 130, the rate of change of the accelerator pedal stroke θacc, etc., and the method of starting the engine 12 may be selected from the result of the determination.

It is to be understood that the above embodiments are mere examples, and that the disclosure may be embodied with various changes or improvements, based on the knowledge of those skilled in the art.

What is claimed is:

1. A control system of a hybrid vehicle that has an engine and a motor as driving force sources, and is configured to be able to stop and start the engine during traveling, comprising:
    a plurality of engine starting units that starts the engine, the engine starting units including a first engine starting unit that curbs increase of an emission amount of particulate matter emitted during starting of the engine; and
    an automatic driving controller that controls traveling of the hybrid vehicle to cause the hybrid vehicle to travel in an automatic driving mode, without at least partially depending on operation by a driver,
    wherein the first engine starting unit starts the engine, when the hybrid vehicle is in a traveling state having a low necessity to quickly increase traveling torque of the hybrid vehicle, and
    wherein it is determined that the hybrid vehicle is in the traveling state having the low necessity to quickly increase the traveling torque of the hybrid vehicle, during execution of the automatic driving controller.

2. A control system of a hybrid vehicle that has an engine and a motor as driving force sources, and is configured to be able to stop and start the engine during traveling, comprising:
- a plurality of engine starting units that starts the engine, the engine starting units including a first engine starting unit that curbs increase of an emission amount of particulate matter emitted during starting of the engine; and
- a following travel controller that causes the hybrid vehicle to travel in a vehicle following mode in which the hybrid vehicle follows a vehicle traveling ahead,
- wherein the first engine starting unit starts the engine, when the hybrid vehicle is in a traveling state having a low necessity to quickly increase traveling torque of the hybrid vehicle, and
- wherein it is determined that the hybrid vehicle is in the traveling state having the low necessity to quickly increase the traveling torque of the hybrid vehicle, during execution of the following travel controller.

3. The control system according to claim 1, wherein it is determined that the hybrid vehicle is in the traveling state having the low necessity to quickly increase the traveling torque of the hybrid vehicle, when required traveling torque during traveling in the automatic driving mode is smaller than a predetermined value set in advance.

4. The control system according to claim 2, wherein it is determined that the hybrid vehicle is in the traveling state having the low necessity to quickly increase the traveling torque of the hybrid vehicle, when required traveling torque during traveling in the vehicle following mode is smaller than a predetermined value set in advance.

5. A control system of a hybrid vehicle that has an engine and a motor as driving force sources, and is configured to be able to stop and start the engine during traveling, comprising:
- a plurality of engine starting units that starts the engine, the engine starting units including a first engine starting unit that curbs increase of an emission amount of particulate matter emitted during starting of the engine; and
- a controller that determines whether a condition under which the emission amount of the particulate matter is likely to increase is satisfied, based on whether one or both of a first condition that an engine coolant temperature of the engine is lower than a predetermined temperature set in advance, and a second condition that an engine stop time from a point in time at which the engine is stopped is equal to or longer than a predetermined time set in advance, are satisfied,
- wherein the first engine starting unit starts the engine, when the hybrid vehicle is in a traveling state having a low necessity to quickly increase traveling torque of the hybrid vehicle.

6. A control system of a hybrid vehicle that has an engine and a motor as driving force sources, and is configured to be able to stop and start the engine during traveling, comprising
- a plurality of engine starting units that starts the engine, the engine starting units including a first engine starting unit that curbs increase of an emission amount of particulate matter emitted during starting of the engine,
- wherein the first engine starting unit starts the engine, when the hybrid vehicle is in a traveling state having a low necessity to quickly increase traveling torque of the hybrid vehicle, and
- wherein the first engine starting unit executes injection and ignition of fuel when an engine speed reaches a predetermined rotational speed set in advance.

7. A control system of a hybrid vehicle that has an engine and a motor as driving force sources, and is configured to be able to stop and start the engine during traveling, comprising
- a plurality of engine starting units that starts the engine, the engine starting units including a first engine starting unit that curbs increase of an emission amount of particulate matter emitted during starting of the engine,
- wherein the first engine starting unit starts the engine, when the hybrid vehicle is in a traveling state having a low necessity to quickly increase traveling torque of the hybrid vehicle,
- wherein the engine starting units further include at least one of:
  - an ignition engine starting unit that injects fuel into a combustion chamber in a condition where a piston of the engine is stopped at a position on an expansion stroke, and ignites the fuel;
  - a compression-stroke engine starting unit that rotates the engine by use of the motor while injecting the fuel, from a condition where the piston of the engine is stopped at a position on a compression stroke, and performs ignition when the piston passes a top dead center; and
  - an intake-stroke engine starting unit that rotates the engine by use of the motor while injecting the fuel, from a condition where the piston of the engine is stopped at a position on an intake stroke, and performs ignition when the piston passes the top dead center,
- wherein one of the ignition engine starting unit, the compression-stroke engine starting unit, and the intake-stroke engine starting unit starts the engine, when the hybrid vehicle is in a traveling state in which the traveling torque needs to be quickly increased.

8. The control system according to claim 1, further comprising a following travel controller that causes the hybrid vehicle to travel in a vehicle following mode in which the hybrid vehicle follows a vehicle traveling ahead,
- wherein it is determined that the hybrid vehicle is in the traveling state having the low necessity to quickly increase the traveling torque of the hybrid vehicle, when required traveling torque during traveling in the vehicle following mode is smaller than a predetermined value set in advance.

9. The control system according to claim 2, further comprising an automatic driving controller that controls traveling of the hybrid vehicle to cause the hybrid vehicle to travel in an automatic driving mode, without at least partially depending on operation by a driver,
- wherein it is determined that the hybrid vehicle is in the traveling state having the low necessity to quickly increase the traveling torque of the hybrid vehicle, when required traveling torque during traveling in the automatic driving mode is smaller than a predetermined value set in advance.

* * * * *